US012720551B2

(12) United States Patent
Yoshimura et al.

(10) Patent No.: US 12,720,551 B2
(45) Date of Patent: Aug. 25, 2026

(54) TERMINAL APPARATUS, BASE STATION APPARATUS, AND COMMUNICATION METHOD

(71) Applicant: SHARP KABUSHIKI KAISHA, Sakai City (JP)

(72) Inventors: Tomoki Yoshimura, Sakai City (JP); Shoichi Suzuki, Sakai City (JP); Toshizo Nogami, Sakai City (JP); Daiichiro Nakashima, Sakai City (JP); Wataru Ouchi, Sakai City (JP); Huifa Lin, Sakai City (JP); Takahisa Fukui, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 346 days.

(21) Appl. No.: 18/268,629

(22) PCT Filed: Dec. 22, 2021

(86) PCT No.: PCT/JP2021/047647

§ 371 (c)(1),
(2) Date: Jun. 21, 2023

(87) PCT Pub. No.: WO2022/138742

PCT Pub. Date: Jun. 30, 2022

(65) Prior Publication Data

US 2024/0049234 A1 Feb. 8, 2024

(30) Foreign Application Priority Data

Dec. 24, 2020 (JP) ................................ 2020-214383

(51) Int. Cl.
*H04W 72/21* (2023.01)
*H04W 72/04* (2023.01)

(52) U.S. Cl.
CPC ............ *H04W 72/21* (2023.01); *H04W 72/04* (2013.01)

(58) Field of Classification Search
CPC .... H04W 72/21; H04W 72/04; H04L 1/0031; H04L 1/0061; H04L 1/0006;
(Continued)

(56) References Cited

U.S. PATENT DOCUMENTS

2021/0392648 A1* 12/2021 Andersson ............ H04L 5/0044
2022/0015092 A1* 1/2022 Li ..................... H04W 28/0858
(Continued)

FOREIGN PATENT DOCUMENTS

KR 10-2020-0078673 * 6/2020

OTHER PUBLICATIONS

NTT Docomo, "New SID Proposal: Study on New Radio Access Technology", RP-160671, 3GPP TSG RAN Meeting #71, Göteborg, Sweden, Mar. 7-10, 2016.
(Continued)

*Primary Examiner* — Sharmin Chowdhury
(74) *Attorney, Agent, or Firm* — ScienBiziP, P.C.

(57) ABSTRACT

A controller configured to select, from a first method and a second method, one method for determination of a size of a transport block to be transmitted on a PUSCH, based on whether scaling is applied to the transport block, and a transmitter configured to transmit the PUSCH are included. In the first method, the size is determined based on $N_{RE}=\min(X1, N^{a}_{RE})\cdot n_{PRB}$. In the second method, the size is determined based on $N_{RE}=\min(X1, N^{a}_{RE})\cdot n_{PRB}\cdot\gamma$. The $\gamma$ is provided by an RRC parameter. In a case that UCI is multiplexed on the PUSCH, the number of coded modulation symbols for the UCI is based on which method is selected as the one method from the first method and the second method.

7 Claims, 15 Drawing Sheets

(58) Field of Classification Search
CPC ... H04L 1/1671; H04L 1/0067; H04L 1/0072; H04L 5/0044; H04L 5/001; H04L 5/0051; H04L 5/0055; H04L 5/0057; H04L 27/26025; H04L 5/0053
See application file for complete search history.

(56) References Cited

U.S. PATENT DOCUMENTS

| | | | | |
|---|---|---|---|---|
| 2022/0217760 | A1* | 7/2022 | Iyer | H04W 72/569 |
| 2023/0119851 | A1* | 4/2023 | Jang | H03M 13/27<br>714/726 |
| 2023/0345471 | A1* | 10/2023 | Seok | H04L 1/0026 |

OTHER PUBLICATIONS

RAN Chairman et al., "Release 17 package for Ran", RP-193216, 3GPP TSG RAN Meeting #86, Sitges, Spain, Dec. 9-12, 2019.

* cited by examiner

Figure A: Number of OFDM symbols per slot, slots per frame, and slots per subframe for normal cyclic prefix.

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure B: Number of OFDM symbols per slot, slots per frame, and slots per subframe for extended cyclic prefix.

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2

REEs for PSS

REs for SSS

REs for PBCH

Frequency

Time (OFDM symbol index $l_{sym}$)

FIG. 7

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2020-214383 filed on Dec. 24, 2020, the contents of which are incorporated herein by reference.

BACKGROUND ART

In the 3rd Generation Partnership Project (3GPP), a radio access method and a radio network for cellular mobile communications (hereinafter also referred to as "Long Term Evolution (LTE)" or "Evolved Universal Terrestrial Radio Access (EUTRA)") have been studied. In LTE, a base station apparatus is also referred to as an evolved NodeB (eNodeB) and a terminal apparatus is also referred to as a User Equipment (UE). LTE is a cellular communication system in which multiple areas covered by base station apparatuses are deployed in a cell structure. A single base station apparatus may manage multiple serving cells, The 3GPP has been studying a next generation standard (New Radio or NR) (NPL 1) to make a proposal for International Mobile Telecommunication (IMT)-2020, a standard for a next generation mobile communication system developed by the International Telecommunication Union (ITU), NR is required to satisfy requirements for three scenarios including enhanced Mobile BroadBand (eMBB), massive Machine Type Communication (mMTC), and Ultra Reliable and Low Latency Communication (URLLC) in a single technology framework.

Study on enhancement of functions of cellular mobile communication, such as NR, is expected. For example, as described in NPL 2, study related to enhancement of functions of NR is under way.

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar., 2016.

NPL 2: "Release 17 package for RAN", RP-193216, RAN chairman, RAN1 chairman, RAN2 chairman, RAN3 chairman, 3CiPP TSG RAN Meeting 486, Sitges, Spain, 9-12 Dec. 2019

SUMMARY OF INVENTION

Technical Problem

The present invention provides a terminal apparatus that efficiently performs communication, a communication method used for the terminal apparatus, a base station apparatus that efficiently performs communication, and a communication method used for the base station apparatus.

Solution to Problem (1) A first aspect of the present invention is a terminal apparatus. The terminal apparatus includes a controller configured to select, from a first method and a second method, one method for determination of a size of a transport block to be transmitted on a PUSCH, based on whether scaling is applied to the transport block, and a transmitter configured to transmit the PUSCH. In the first method, the size is determined based on $N_{RE}$=min(X1, $N^{a}_{RE}$)·$n_{PRB}$. In the second method, the size is determined based on $N_{RE}$=min(X1, $N^{a}_{RE}$)·$n_{PRB}$·γ. The γ is provided by an RRC parameter. In a case that UCI is multiplexed on the PUSCH, the number of coded modulation symbols for the UCI is based on which method is selected as the one method from the first method and the second method.

(2) A second aspect of the present invention is a base station apparatus. The base station apparatus includes a controller configured to select, from a first method and a second method, one method for determination of a size of a transport block to be transmitted on a PUSCH, based on whether scaling is applied to the transport block, and a receiver configured to receive the PUSCH. In the first method, the size is determined based on $N_{RE}$=min(X1, $N^{a}_{RE}$)·$n_{PRB}$. In the second method, the size is determined based on $N_{RE}$=min(X1, $N^{a}_{RE}$)·$n_{PRB}$·γ. The γ is provided by an RRC parameter. In a case that UCI is multiplexed on the PUSCH, the number of coded modulation symbols for the UCI is based on which method is selected as the one method from the first method and the second method.

(3) A third aspect of the present invention is a communication method used for a terminal apparatus. The communication method includes the steps of selecting, from a first method and a second method, one method for determination of a size of a transport block to be transmitted on a PUSCH, based on whether scaling is applied to the transport block, and transmitting the PUSCH. In the first method, the size is determined based on $N_{RE}$=min(X1, $N^{a}_{RE}$)·$n_{PRB}$. In the second method, the size is determined based on $N_{RE}$=min(X1, $N^{a}_{RE}$)·$n_{PRB}$·γ. The γ is provided by an RRC parameter. In a case that UCI is multiplexed on the PUSCH, the number of coded modulation symbols for the Lini is based on which method is selected as the one method from the first method and the second method.

Advantageous Effects of Invention

According to the present invention, the terminal apparatus can efficiently perform communication. The base station apparatus can efficiently perform communication,

BRIEF DESCRIPTION OF DRAWINGS

FIG. 2 is an example illustrating a relationship between the subcarrier spacing configuration the number $N^{slot}_{symb}$ of OFDM symbols per slot, and a cyclic Prefix (CP) configuration according to an aspect of the present embodiment.

FIG. 7 is a diagram illustrating a configuration example of an SS/PBCH block according to an aspect of the present embodiment.

In FIG. 9, a horizontal axis indicates a time domain. A grid line of the horizontal axis indicates a boundary between slots.

DESCRIPTION OF EMBODIMENTS

An embodiment of the present invention will be described below.

floor(C) may be a floor function for a real number C. For example, floor(C) may be a function that outputs a maximum integer in a range of not exceeding the real number C. ceil(D) may be a roof function for a real number D. For example, ceil(D) may be a function that outputs a minimum integer in a range of not falling below the real number D. mod(E, F) may be a function that outputs a remainder obtained by dividing E by F. mod(E, F) may be a function that outputs a value corresponding to the remainder obtained by dividing E by F. exp(G)=e^G. Here, e is a Napier's constant. H^I represents H to the power of I. max(J, K) is a function that outputs a maximum value out of J and 1. Here, in a case that J and K are equal, max(1, K) is a function that outputs J or K. min(L, M) is a function that outputs a maximum value out of L and M. Here, in a case that L and M are equal, min(L, M) is a function that outputs L or M. round(N) is a function that outputs an integer value of a value closest to N.

Figure 1:
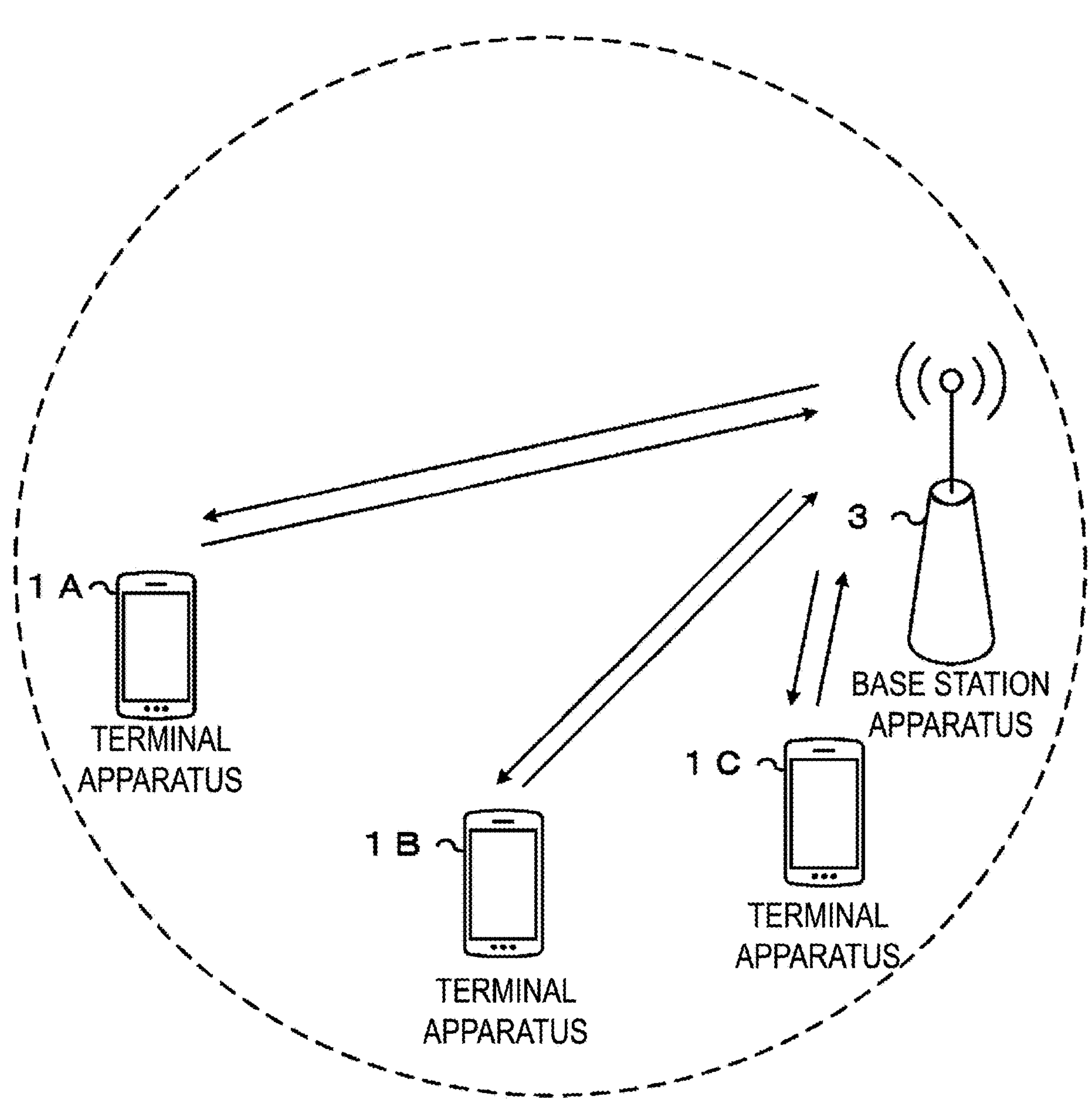
FIG. 1 is a conceptual diagram of a radio communication system according to an aspect of the present embodiment.

FIG. 1 is a conceptual diagram of a radio communication system according to an aspect of the present embodiment. In FIG. 1, the radio communication system at least includes terminal apparatuses 1A to 1C and a base station apparatus 3 (Base station #3 (BS #3)). As a general term for the terminal apparatuses 1A to 1C, each terminal apparatus that performs communication with the base station apparatus 3 is hereinafter also referred to as a terminal apparatus 1 (User Equipment #1 (UE #1)).

In the radio communication system, at least one communication scheme may be used. The one communication scheme may be Orthogonal Frequency Division Multiplex (OFDM). For example, in the downlink being communication from the base station apparatus 3 to the terminal apparatus 1, Cyclic Prefix-Orthogonal Frequency Division Multiplex (CP-OFDM) may be at least used. In the uplink being communication from the terminal apparatus 1 to the base station apparatus 3, either of CP-OFDM or Discrete Fourier Transform—spread—Orthogonal Frequency Division Multiplex (DFT-s-OFDM) may be at least used. DFT-s-OFDM is a communication scheme in which Transform precoding is applied prior to signal generation in CP-OFDM. Here, transform precoding is also referred to as DFT precoding.

The base station apparatus 3 may include one or multiple transmission apparatuses (or transmission points, transmission and/or reception apparatuses, transmission and/or reception points). In a case that the base station apparatus 3 includes multiple transmitting apparatuses, the multiple transmitting apparatuses may be deployed at geographically different positions, or may be deployed at the geographically same position. In a case that multiple transmitting apparatuses are deployed at the geographically same position, this may mean that the multiple transmitting apparatuses are configured as one apparatus.

The base station apparatus 3 may provide one or multiple serving cells. Each serving cell may be defined as a set of resources used for radio communication. The serving cell is also referred to as a cell.

The serving cell may include at least one downlink component carrier and/or one uplink component carrier. The serving cell may at least include two or more downlink component carriers, and/or two or more uplink component carriers. Each of the downlink component carrier and the uplink component carrier is also referred to as a component carrier, For example, for one component carrier, one resource grid may be given. For a pair of one component carrier and a certain subcarrier spacing configuration μ, one resource grid may be given. Here, the subcarrier spacing configuration μ is also referred to as numerology. The resource grid includes $N^{size,\mu}_{grid,x}N^{RB}_{sc}$ subcarriers. The resource grid starts from a common resource block $N^{start,\mu}_{grid,x}$. The common resource block $N^{start,\mu}_{grid,x}$ is also referred to as a reference point of the resource grid. The resource grid includes $N^{subframe,\mu}_{symb}$ OMNI symbols. x is a subscript indicating a transmission direction, and indicates either of a downlink or an uplink. For a set of a certain antenna port p, a certain subcarrier spacing configuration μ, and a certain transmission direction x, one resource grid is given.

$N^{size,\mu}_{grid,x}$ and $N^{start,\mu}_{grid,x}$ are given based at least on a higher layer parameter (CarrierBandwidth). The higher layer parameter is also referred to as an SCS specific carrier. One resource grid corresponds to one SCS specific carrier. One component carrier may include one or multiple SCS specific carriers. The SCS specific carrier may be included in system information. For each of the SCS specific carriers, one subcarrier spacing configuration p may be given, The SubCarrier Spacing (SCS) Δf may be Δf=2 μ·15 kHz. For example, the subcarrier spacing configuration p may indicate one of 0, 1, 2, 3, or 4.

FIG. 2 is an example illustrating a relationship between the subcarrier spacing configuration μ, the number $N^{slot}_{symb}$ of OFDM symbols per slot, and a cyclic Prefix (CP) configuration according to an aspect of the present embodiment, In FIG, 2A, for example, in a case that the subcarrier spacing configuration u is two and the CP configuration is a normal cyclic prefix (normal CP), $N^{slot}_{symb}$=14, $N^{frame,\mu}_{slot}$=40, and $N^{subframe,\mu}_{slot}$=4. In FIG. 2B, for example, in a case that the subcarrier spacing configuration u is two and the CP configuration is an extended cyclic prefix (extended CP), $N^{slot}_{symb}$=14, $N^{frame,\mu}_{slot}$=40, and $N^{subframe,\mu}_{slot}$=4.

In the radio communication system according to an aspect of the present embodiment, time unit $T_c$ may be used for expression of the length of the time domain. The time unit $T_c$ is $T_c=1/(\Delta f_{max}\cdot N_f)$. $\Delta f_{max}$=480 kHz. $N_f$=4096. A constant κ is $\kappa=N_f/(\Delta f_{ref}N_{f,ref}=64$. $\Delta f_{ref}$ is 15 kHz. $N_{f,ref}$ is 2048.

Transmission of a signal in the downlink and/or transmission of a signal in the uplink may be organized into a radio frame (system frame, frame) having the length $T_f$. $T_f$ $(\Delta f_{max}N_f/100)\cdot T_s$=10 ms. "·" represents multiplication. The radio frame includes 10 subframes. The length $T_{sf}$ of the subframe is $(\Delta f_{max}N_f/100)\cdot T_s$=1 ms. The number of OFDM symbols per subframe is $N^{subframe,\mu}_{symb}=N^{slot}_{symb}$ $N^{subframe,\mu}_{slot}$.

The OFDM symbol is a time domain unit of one communication scheme. For example, the OFDM symbol may be a time domain unit of CP-OFDM. The OFDM symbol may be a time domain unit of DFT-s-OFDM, The slot may include multiple OFDM symbols. For example, $N^{slot}_{symb}$ continuous OFDM symbols may be included in one slot. For example, $N^{slot}_{symb}$ may be 14.

The slot may be assigned an index in the time domain. For example, slot indexes $n^{\mu}_{s}$ may be given in ascending order in the subframe with integer values within a range of 0 to $N^{subframe,\mu}_{slot}-1$. Slot indexes $n^{\mu}_{s,f}$ may be given in ascending order in the radio frame with integer values within a range of 0 to $N^{frame,\mu}_{slot}-1$.

Figure 3:
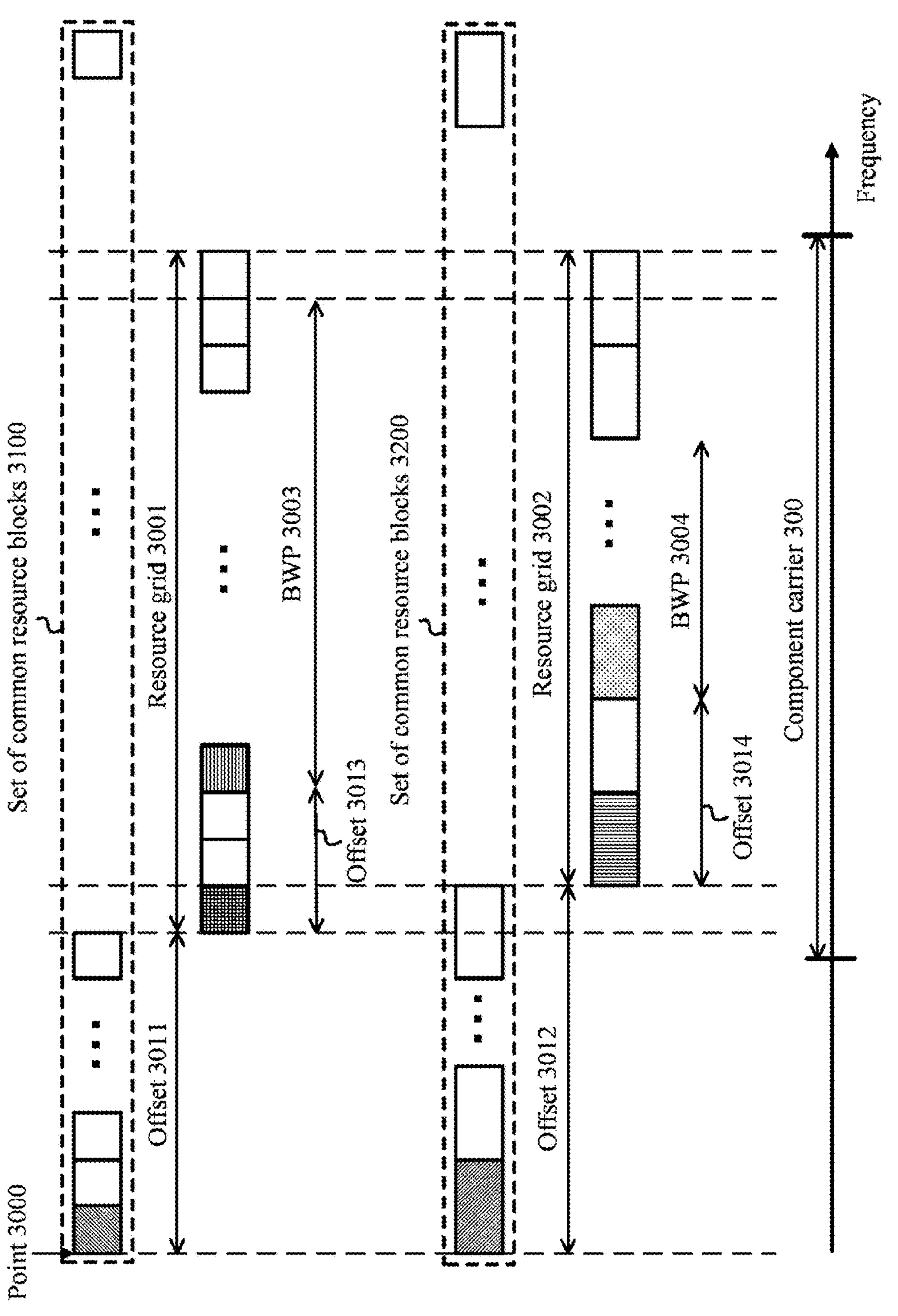
FIG. 3 is a diagram illustrating an example of a configuration method of a resource grid according to an aspect of the present embodiment.

FIG. 3 is a diagram illustrating an example of a configuration method of the resource grid according to an aspect of the present embodiment. The horizontal axis of FIG. 3 represents a frequency domain. FIG. 3 illustrates a configuration example of a resource grid of a subcarrier spacing configuration $\mu_1$ in a component carrier 300, and a configuration example of a resource grid of a subcarrier spacing configuration $\mu_2$ in the certain component carrier. As described above, for a certain component carrier, one or multiple subcarrier spacings may be configured.

A Point 3000 is an identifier for identifying a certain subcarrier. The point 3000 is also referred to as a point A. A Common resource block (CRB) set 3100 is a set of common resource blocks for the subcarrier spacing configuration $\mu_1$.

In the common resource block set 3100, a common resource block (block hatched with lines rising diagonally up and to the right in FIG. 3) including the point 3000 is also referred to as a reference point of the common resource block set 3100. The reference point of the common resource block set 3100 is a common resource block having an index of 0 for the subcarrier spacing configuration $\mu_1$.

An offset 3011 is an offset from the reference point of the common resource block set 3100 to a reference point of a resource grid 3001. The offset 3011 is represented by the number of common resource blocks for the subcarrier spacing configuration $\mu_1$. The resource grid 3001 includes $N^{size,\mu}_{grid1,x}$ common resource blocks starting from the reference point of the resource grid 3001.

An offset 3013 is an offset from the reference point of the resource grid 3001 to a reference point ($N^{start,\mu}_{BWP,i1}$) of a BandWidth Part (BAN?) 3003 having an index of i1. The reference point of the BWP 3003 having an index of i1 is a physical resource block having an index of 0 for the BWP.

A common resource block set 3200 is a set of corn on resource blocks for the subcarrier spacing configuration $\mu_2$.

In the common resource block set 3200, a common resource block (block hatched with lines rising diagonally up and to the left in FIG. 3) including the point 3000 is also referred to as a reference point of the common resource block set 3200. The reference point of the common resource block set 3200 is a common resource block having an index of 0 for the subcarrier spacing configuration $\mu_2$.

An offset 3012 is an offset from the reference point of the common resource block set 3200 to a reference point of a resource grid 3002. The offset 3012 is represented by the number of common resource blocks for the subcarrier spacing $\mu_2$. The resource grid 3002 includes $N^{size,\mu}_{grid2,x}$ common resource blocks starting from the reference point of the resource grid 3002.

An offset 3014 is an offset from the reference point of the resource grid 3002 to a reference point ($N^{start,\mu}_{BWP,i1}$) of a BWP 3004 having an index of i2. The reference point of the IMP 3004 having an index of i2 is a physical resource block having an index of 0 for the BWP.

Figure 4:
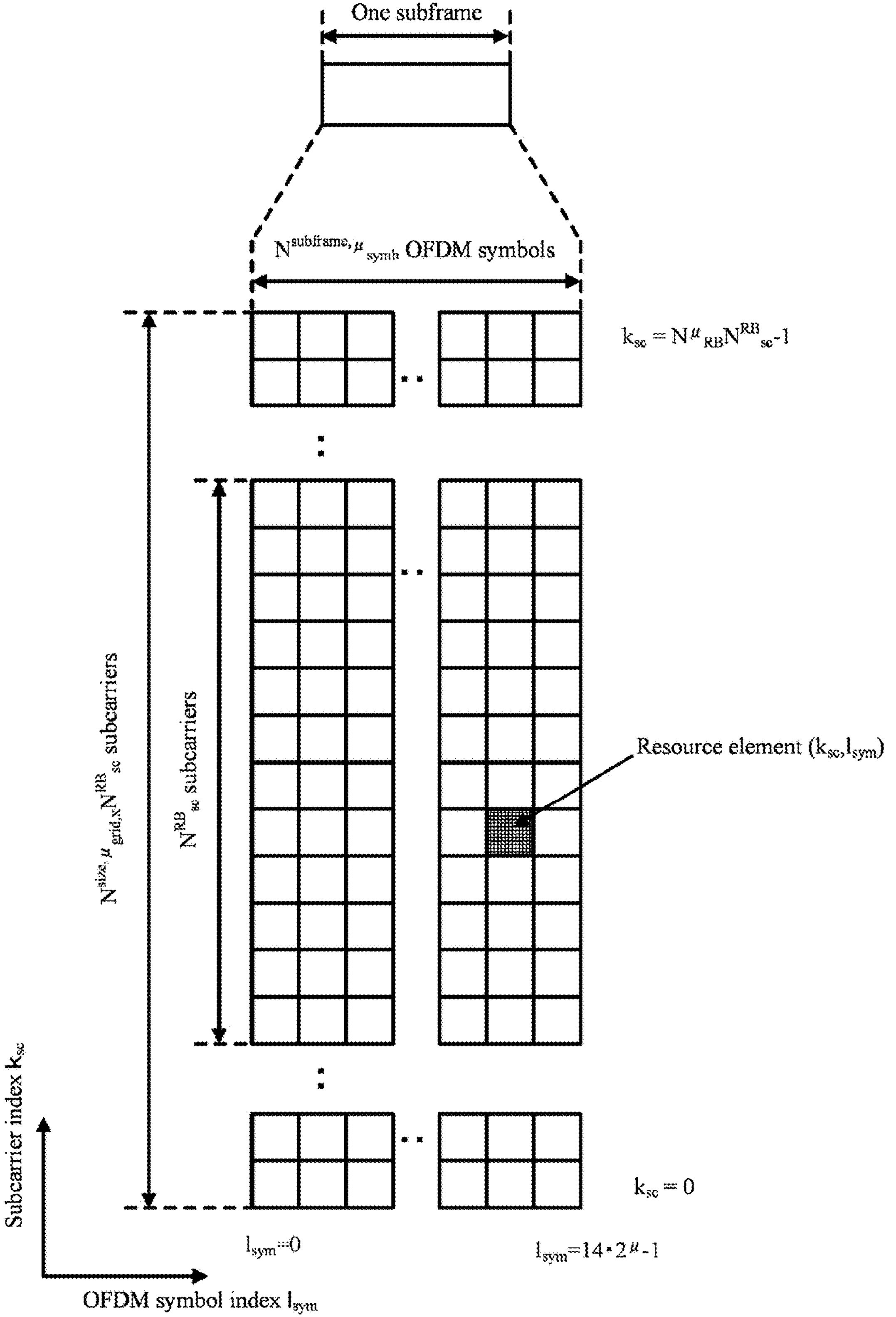
FIG. 4 is a diagram illustrating a configuration example of a resource grid 3001 according to an aspect of the present embodiment.

FIG. 4 is a diagram illustrating a configuration example of the resource grid 3001 according to an aspect of the present embodiment. In the resource grid of FIG. 4, the horizontal axis corresponds to an OFDM symbol index $1_{sym}$, and the vertical axis corresponds to a subcarrier index The resource grid 3001 at least includes $N^{size,\mu}_{grid1,x}N^{RB}_{sc}$ subcarriers, $N^{subframe,\mu}_{symb}$, OFDM symbols. In the resource grid, a resource identified with the subcarrier index $k_{sc}$ and the OFDM symbol index $I_{sym}$ is also referred to as a Resource Element (RE).

The frequency domain of the resource grid corresponds to an SCS-specific carrier. A configuration of the SCS-specific carrier includes a part or all of an offset and a band configuration. The offset indicates an offset from the reference point of the common resource block set to the reference point of the resource grid. For example, each of the offset 3011 and the offset 3012 is an offset included in the configuration of the SCS-specific carder. The band configuration indicates a bandwidth of the SCS-specific carrier. Here, the bandwidth of the SCS-specific carrier corresponds to a bandwidth of the resource grid. For example, each of $N^{size,\mu}_{grid1,x}$ and $N^{size,\mu}_{grid2,x}$ is a band configuration included in the configuration of the SCS-specific carrier.

The Resource Block (RB) includes $N^{RB}_{sc}$ continuous subcarriers. The resource block is a general term for a common resource block, a Physical Resource Block (PRB), and a Virtual Resource Block (VRB). For example, $N^{RB}_{sc}$ may be 12.

In the common resource block set for a certain subcarrier spacing configuration the common resource blocks are assigned indexes in ascending order from 0 in the frequency domain. The common resource block having an index of 0 for a certain subcarrier spacing configuration μ includes (or collides with, matches) the point 3000. An index $n^{\mu}_{CRB}$ of the common resource block for a certain subcarrier spacing configuration p. satisfies a relationship of $n^{\mu}_{CRB}=\text{ceil}(k_{sc,c}/N^{RB}_{sc}$. Here, a subcarrier with $k_{sc,c}=0$ is a subcarrier having the same center frequency as the center frequency of a subcarrier corresponding to the point 3000. $k_{sc,c}$ indicates an index of a subcarrier in the common resource block set.

In the physical resource block set for a certain subcarrier spacing configuration u, the physical resource blocks are assigned indexes in ascending order from 0 in the frequency domain. An index $n^{\mu}_{PRB}$ of the physical resource block for a certain subcarrier spacing configuration μ satisfies a relationship of $n^{\mu}_{CRB}=n^{\mu}_{PRB}+N^{start,\mu}_{BWP,i}$. Here, $N^{start,\mu}_{BWP,i}$ indicates a reference point of the BWP having an index of i.

The BWP may be configured as a part of a frequency band of the component carrier. For example, the BWP may be defined as a subset of common resource blocks included in the resource grid. For example, the BWP may include $N^{size,\mu}_{BWP,i}$ common resource blocks starting from the reference point $N^{start,\mu}_{BWP,i}$ of the BWP. A BWP configured for the downlink is also referred to as a downlink BWP. A BWP configured for the uplink is also referred to as an uplink BWP.

An antenna port may be defined by that a channel on which a symbol in a certain antenna port is conveyed can be inferred from a channel on which another symbol in the certain antenna port is conveyed (an antenna port is defined such that the channel over which a symbol on the antenna port is conveyed can be inferred from the channel over which another symbol on the same antenna port is conveyed). For example, the channel may correspond to a physical channel. The symbol may correspond to a modulation symbol mapped to a resource element.

In a case that a large scale property of a channel over which a symbol on one antenna port is conveyed can be inferred from a channel over which a symbol on another antenna port is conveyed, it may be considered that the two antenna ports are in a Quasi Co-Located (QCL) relationship. The large scale property may at least include long term performance of a channel. The large scale property may at least include a part or all of delay spread, Doppler spread, Doppler shift, an average gain, an average delay, and a beam parameter (spatial Rx parameters). The fact that the first antenna port and the second antenna port are QCL with respect to a beam parameter may mean that a receive beam assumed by a receiver for the first antenna port and a receive beam assumed by the receiver for the second antenna port are the same. The fact that the first antenna port and the second antenna port are QCL with respect to a beam parameter may mean that a transmit beam assumed by a receiver for the first antenna port and a transmit beam assumed by the receiver for the second antenna port are the same. In a case that the large scale property of a channel over which a symbol on one antenna port is conveyed can be inferred from a channel over which a symbol on another antenna port is conveyed, the terminal apparatus 1 may assume that the two antenna ports are QCL. The fact that two antenna ports are QCL may mean that it is assumed that the two antenna ports are QCL.

Carrier aggregation may mean that communication is performed by using multiple serving cells being aggregated. Carrier aggregation may mean that communication is performed by using multiple component carriers being aggregated. Carrier aggregation may mean that communication is performed by using multiple downlink component carriers being aggregated. Carrier aggregation may mean that communication is performed by using multiple uplink component carriers being aggregated.

Figure 5:
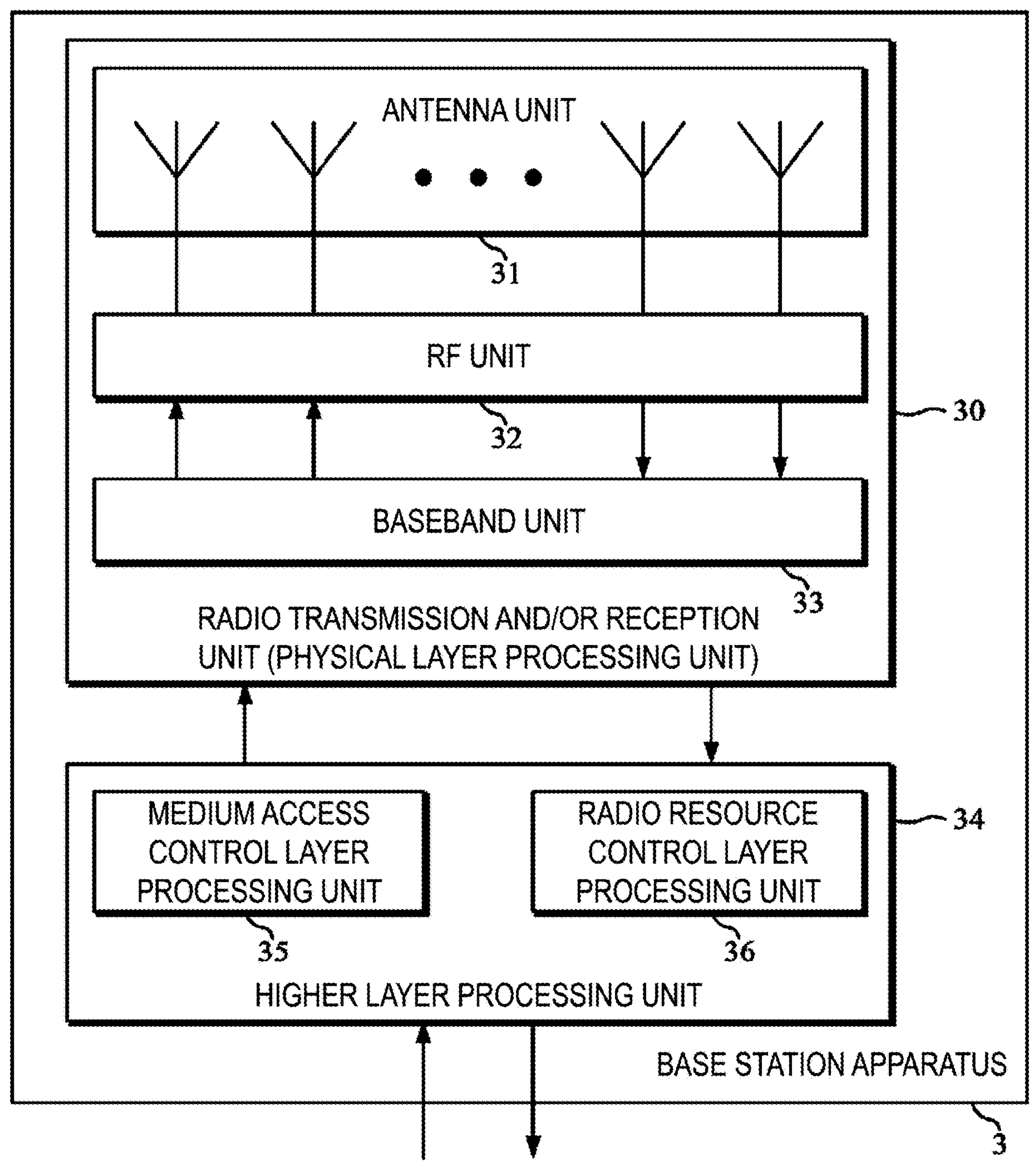
FIG. 5 is a schematic block diagram illustrating a configuration example of a base station apparatus 3 according to an aspect of the present embodiment.

FIG. 5 is a schematic block diagram illustrating a configuration example of the base station apparatus 3 according to an aspect of the present embodiment. As illustrated in FIG. 5, the base station apparatus 3 at least includes a part or all of a radio transmission and/or reception unit (physical layer processing unit) 30 and/or a higher layer processing unit 34. The radio transmission and/or reception unit 30 at least includes a part or all of an antenna unit 31, a Radio Frequency (RF) unit 32, and a baseband unit 33. The higher layer processing unit 34 at least includes a part or all of a medium access control layer processing unit 35 and a Radio Resource Control (RRC) layer processing unit 36.

The radio transmission and/or reception unit 30 at least includes a part or all of a radio transmitting unit 30*a* and a radio receiving unit 30*b*. Here, apparatus configurations of the baseband unit included in the radio transmitting unit 30*a* and the baseband unit included in the radio receiving unit 30*b* may be the same or different from each other. Apparatus configurations of the RF unit included in the radio transmitting unit 30*a* and the RF unit included in the radio receiving unit 30*b* may be the same or different from each other. Apparatus configurations of the antenna unit included in the radio transmitting unit 30*a* and the antenna unit included in the radio receiving unit 30*b* may be the same or different from each other.

For example, the radio transmitting unit 30*a* may generate a baseband signal of a downlink physical channel. For example, the radio transmitting unit 30*a* may generate a baseband signal of a downlink physical signal.

For example, the radio receiving unit 30*b* may attempt to detect information conveyed on an uplink physical channel. For example, the radio receiving unit 30*b* may attempt to detect information conveyed on an uplink physical signal.

The higher layer processing unit 34 outputs downlink data (for example, a transport block) to the radio transmission and/or reception unit 30 (or the radio transmitting unit 30*a*). The higher layer processing unit 34 performs a part or all of processing of a Medium Access Control (MAC) layer, a Packet Data Convergence Protocol (PI)CP) layer, a Radio Link Control (RLC) layer, and an RRC layer.

The medium access control layer processing unit 35 included in the higher layer processing unit 34 performs processing of the MAC layer.

The radio resource control layer processing unit 36 included in the higher layer processing unit 34 performs processing of the RRC layer. The radio resource control layer processing unit 36 manages various pieces of configuration information/parameters (for example, RRC parameters) of the terminal apparatus 1. The radio resource control layer processing unit 36 sets the RRC parameter, based on an RRC message received from the terminal apparatus 1.

The radio transmission and/or reception unit 30 (or the radio transmitting unit 30*a*) performs a part or all of modulation processing, coding processing, and transmission processing. The radio transmission and/or reception unit 30 (or the radio transmitting unit 30*a*) generates a physical signal through a part or all of modulation processing, coding processing, and baseband signal generation (conversion into a time-continuous signal) processing performed on downlink data. The radio transmission and/or reception unit 30 (or the radio transmitting unit 30*a*) may map the physical signal to a certain component carder. The radio transmission and/or reception unit 30 (or the radio transmitting unit 30*a*) transmits the generated physical signal.

The radio transmission and/or reception unit 30 (or the radio receiving unit 30*b*) performs a part or all of demodulation processing, decoding processing, and reception processing. The radio transmission and/or reception unit 30 (or the radio receiving unit 30*b*) outputs information detected based at least on demodulation processing and decoding processing performed on a received physical signal to the higher layer processing unit 34.

The radio transmission and/or reception unit 30 (or the radio receiving unit 30*b*) may perform carrier sensing prior to transmission of the physical signal, The RF unit 32 converts a signal received via the antenna unit 31 into a baseband signal by means of orthogonal demodulation, and removes unnecessary frequency components. The RF unit 32 outputs an analog signal to the baseband unit.

The baseband unit 33 converts an analog signal input from the RF unit 32 into a digital signal. The baseband unit 33 removes a portion corresponding to a Cyclic Prefix (CP) from the converted digital signal, performs a Fast Fourier Transform (FFT) on the signal from which the CP has been removed, and extracts a signal in the frequency domain.

The baseband unit 33 performs Inverse Fast Fourier Transform (IFFT) on downlink data to generate an OFDM symbol, adds a CP to the generated OFDM symbol, generates a baseband digital signal, and converts the baseband digital signal into an analog signal. The baseband unit 33 outputs the converted analog signal to the RF unit 32. Prior to the inverse fast Fourier transform, transform precoding may be applied to the downlink data.

The RF unit 32 removes an unnecessary frequency component from the analog signal input from the baseband unit 33 by using a low-pass filter, up converts the analog signal into a carrier frequency, and transmits the converted analog signal via the antenna unit 31. The RF unit 32 may have a function of controlling transmission power. The RF unit 32 is also referred to as a transmission power control unit.

For the terminal apparatus 1, one or multiple serving cells (or component carriers, downlink component carriers, uplink component carriers) may be configured.

Each of the serving cells configured for the terminal apparatus 1 may be one of a Primary cell (PCell), a Primary SCG cell (PSCell), or a Secondary Cell (SCell), The PCell is a serving cell included in a Master Cell Group (MCG). The PCell is a cell in which an initial connection establishment procedure or a connection re-establishment procedure is performed (has been performed) by the terminal apparatus 1.

The PSCell is a serving cell included in a Secondary Cell Group (SCG). The PSCell is a serving cell in which random access is performed by the terminal apparatus 1 in a reconfiguration procedure with synchronization (Reconfigration with synchronization).

The SCell may be included in either of the MCG or the SCG.

A serving cell group (cell group) is a term at least including an MCG and an SCG. The serving cell group may include one or multiple serving cells (or component carriers). One or multiple serving cells (or component carriers) included in the serving cell group may be operated by means of carrier aggregation.

One or multiple downlink MVPs may be configured for each of the serving cells (or downlink component carriers). One or multiple uplink BWPs may be configured for each of the serving cells (or uplink component carriers).

Among one or multiple downlink BWPs configured for the serving cell (or the downlink component carrier), one downlink BWP may be configured as an active downlink BWP (or one downlink BWP may be activated). Among one or multiple uplink BWPs configured for the serving cell (or the uplink component carrier), one uplink BWP may be configured as an active uplink BWP (or one uplink BWP may be activated).

The PDSCH, the PDCCH, and the CSI-RS may be received in the active downlink BWP. The terminal apparatus 1 may receive the PDSCH, the PDCCH, and the CSI-RS in the active downlink BWP. The PUCCH and the PDSCH may be transmitted in the active uplink BWP. The terminal apparatus 1 may transmit the PUCCH and the PDSCH in the active uplink BWP. The active downlink IMP and the active uplink IMP are also referred to as an active BWP.

The PDSCH, the PDCCH, and the CSI-RS need not be received in downlink BWPs (inactive downlink BWPs) other than the active downlink BWP. The terminal apparatus 1 need not receive the PDSCH, the PDCCH, and the CSI-RS in the downlink BWP other than the active downlink BWP. The PUCCH and the PUSCH need not be transmitted in uplink BWPs (inactive uplink BWPs) other than the active uplink BWP. The terminal apparatus 1 need not transmit the PUCCH and the PUSCH in an uplink BWP other than the active uplink BWP. The inactive downlink BWP and the inactive uplink BWP are also referred to as an inactive BWP.

Downlink BWP switch is used for deactivating one active downlink BWP, and activating any one of the inactive downlink BWPs other than the one active downlink BWP. The downlink BWP switch may be controlled by a BWP field included in downlink control information. The downlink BWP switch may be controlled based on a higher layer parameter.

Uplink BWP switch is used for deactivating one active uplink BWP, and activating any one of the inactive uplink BWPs other than the one active uplink BWP. The uplink BWP switch may be controlled by a BWP field included in downlink control information. The uplink BWP switch may be controlled based on a higher layer parameter.

Among one or multiple downlink BWPs configured for the serving cell, two or more downlink BWPs need not be configured for the active downlink BWP. For the serving cell, at certain time, one downlink BWP may be active.

Among one or multiple uplink BWPs configured for the serving cell, two or more uplink BWPs need not be configured for the active uplink BWP. For the serving cell, at certain time, one uplink BWP may be active.

Figure 6:
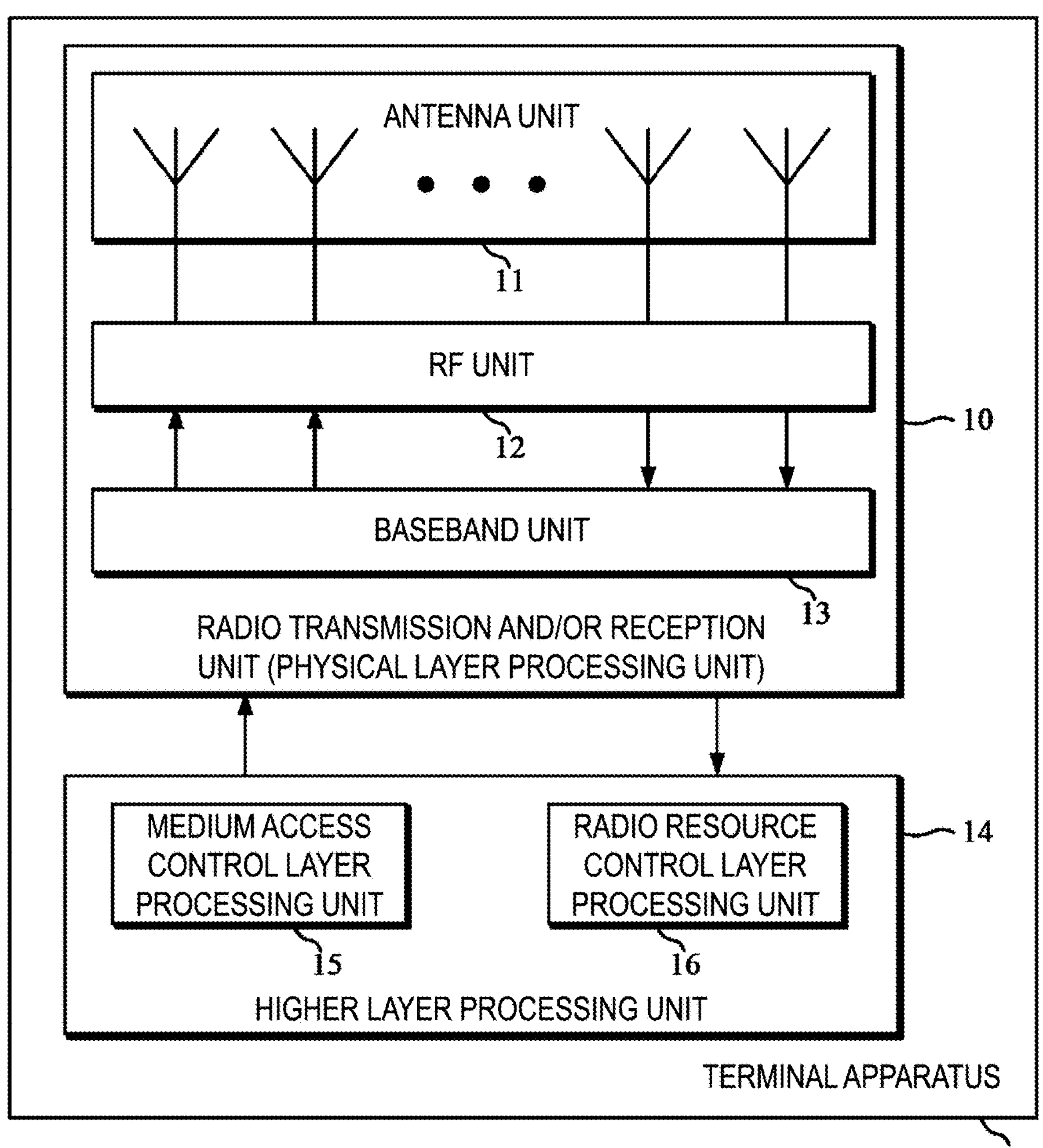
FIG. 6 is a schematic block diagram illustrating a configuration example of a terminal apparatus 1 according to an aspect of the present embodiment.

FIG. 6 is a schematic block diagram illustrating a configuration example of the terminal apparatus 1 according to an aspect of the present embodiment. As illustrated in FIG. 6, the terminal apparatus 1 at least includes a part or all of a radio transmission and/or reception unit (physical layer processing unit) 10 and a higher layer processing unit 14. The radio transmission and/or reception unit 10 at least includes a part or all of an antenna unit 11, an RF unit 12, and a baseband unit 13. The higher layer processing unit 14 at least includes a part or all of a medium access control layer processing unit 15 and a radio resource control layer processing unit 16.

The radio transmission and/or reception unit 10 at least includes a part or all of a radio transmitting unit 10*a* and a radio receiving unit 10*b*. Here, apparatus configurations of the baseband unit 13 included in the radio transmitting unit 10*a* and the baseband unit 13 included in the radio receiving unit 10*b* may be the same or different from each other. Apparatus configurations of the RF unit 12 included in the radio transmitting unit 10*a* and the RF unit 12 included in the radio receiving unit 10*b* may be the same or different from each other. Apparatus configurations of the antenna unit 11 included in the radio transmitting unit 10*a* and the antenna unit 11 included in the radio receiving unit 10*b* may be the same or different from each other.

For example, the radio transmitting unit 10*a* may generate a baseband signal of an uplink physical channel, For example, the radio transmitting unit 10*a* may generate a baseband signal of an uplink physical signal.

For example, the radio receiving unit 10*b* may attempt to detect information conveyed on a. downlink physical channel. For example, the radio receiving unit 10*b* may attempt to detect information conveyed on an uplink physical signal.

The higher layer processing unit 14 outputs uplink data (for example, a transport block) to the radio transmission and/or reception unit 10 (or the radio transmitting unit 10*a*). The higher layer processing unit 14 performs a part or all of processing of a MAC layer, a packet data convergence protocol layer, a radio link control layer, and an RRC layer.

The medium access control layer processing unit 15 included in the higher layer processing unit 14 performs processing of the MAC layer.

The radio resource control layer processing unit 16 included in the higher layer processing unit 14 performs processing of the RRC layer. The radio resource control layer processing unit 16 manages various pieces of configuration information/parameters (for example, RRC parameters) of the terminal apparatus 1. The radio resource control layer processing unit 16 sets the RRC parameters, based on an RRC message received from the base station apparatus 3.

The radio transmission and/or reception unit 10 (or the radio transmitting unit 10*a*) performs a part or all of modulation processing, coding processing, and transmission processing. The radio transmission and/or reception unit 10 (or the radio transmitting unit 10*a*) generates a physical signal through a part or all of modulation processing, coding processing, and baseband signal generation (conversion into a time-continuous signal) processing performed on uplink data. The radio transmission and/or reception unit 10 (or the radio transmitting unit 10*a*) may map the physical signal to a certain IMP (active uplink BWP). The radio transmission and/or reception unit 10 (or the radio transmitting unit 10*a*) transmits the generated physical signal.

The radio transmission and/or reception unit 10 (or the radio receiving unit 10*b*) performs a part or all of demodulation processing, decoding processing, and reception processing. The radio transmission and/or reception unit 10 (or the radio receiving unit 30*b*) may receive a physical signal in a certain BWP (active downlink BWP) of a certain serving cell. The radio transmission and/or reception unit 10 (or the radio receiving unit 10*b*) outputs information detected based at least on demodulation processing and decoding processing performed on the received physical signal to the higher layer processing unit 14.

The radio transmission and/or reception unit 10 (radio receiving unit 10*b*) may perform carrier sensing prior to transmission of the physical signal.

The RF unit 12 converts a signal received via the antenna unit 11 into a baseband signal by means of orthogonal demodulation, and removes unnecessary frequency components. The RF unit 12 outputs a processed analog signal to the baseband unit 13.

The baseband unit 13 converts the analog signal input from the RF unit 12 into a digital signal. The baseband unit 13 removes a portion corresponding to a Cyclic Prefix (CP) from the converted digital signal, performs a Fast Fourier Transform (FFT) on the signal from which the CP has been removed, and extracts a signal in the frequency domain.

The baseband unit 13 performs Inverse Fast Fourier Transform (IFFT) on uplink data to generate an OFDM symbol, adds a CP to the generated OFDM symbol, generates a baseband digital signal, and converts the baseband digital signal into an analog signal. The baseband unit 13 outputs the converted analog signal to the RE unit 12. Prior to the inverse fast Fourier transform, transform precoding may be applied to the uplink data.

The RF unit 12 removes unnecessary frequency components from the analog signal input from the baseband unit 13 through a low-pass filter, up converts the analog signal into a signal of a carrier frequency, and transmits the up converted signal via the antenna unit 11. The RF unit 12 may have a function of controlling transmission power. The RF unit 12 is also referred to as a transmission power control unit, The physical signal (signal) will be described below.

The physical signal is a general term for a downlink physical channel, a downlink physical signal, an uplink physical channel, and an uplink physical channel. The physical channel is a general term for a downlink physical channel and an uplink physical channel. The physical signal is a general term for a downlink physical signal and an uplink physical signal.

The uplink physical channel may correspond to a set of resource elements for carrying information that is generated in a higher layer. The uplink physical channel may be a physical channel used in the uplink component carrier. The uplink physical channel may be transmitted by the terminal apparatus 1. The uplink physical channel may be received by the base station apparatus 3. In the uplink of the radio communication system according to an aspect of the present embodiment, at least a part or all of the following uplink physical channels may be used.

Physical Uplink Control CHannel (PUCCH)

Physical Uplink Shared CHannel (PUSCH)

Physical Random Access CHannel (PRACH)

The PUCCH may be used to transmit Uplink Control Information (UCI). The PUCCH may be transmitted for conveying (delivering, transmitting) the uplink control information. The uplink control information may be mapped to the PUCCH. The terminal apparatus 1 may transmit the PUCCH to which the uplink control information is mapped. The base station apparatus 3 may receive the PUCCH to which the uplink control information is mapped.

The uplink control information (uplink control information bit, uplink control information sequence, uplink control information type) at least includes a part or all of Channel State Information (CSI), a Scheduling Request (SR), and Hybrid Automatic Repeat request Acknowledgement (HARQ-ACK) information.

The channel state information is also referred to as a channel state information bit or a channel state information sequence. The scheduling request is also referred to as a scheduling request bit or a scheduling request sequence. The HARQ-ACK information is also referred to as a HARQ-ACK information bit or a HARQ-ACK information sequence.

The HARQ-ACK information may at least include a HARQ-ACK corresponding to a Transport block (or TB, Medium Access Control Protocol Data Unit (MAC PDU), Downlink-Shared Channel (DL-SCH), Uplink-Shared Channel (UL-SCH), Physical Downlink Shared Channel (PDSCH), Physical Uplink Shared Channel (PUSCH)). The HARQ-ACK may indicate an acknowledgement (ACK) or a negative-acknowledgement (NACK) corresponding to the transport block. The ACK may indicate that decoding of the transport block has been completed successfully (has been decoded). The NACK may indicate that decoding of the transport block has not been completed successfully (has not been decoded). The HARQ-ACK information may include a HARQ-ACK codebook including one or multiple HARQ-ACK bits.

The fact that the HARQ-ACK information and the transport block correspond to each other may mean that the HARQ-ACK information and the PDSCH used for conveying the transport block correspond to each other.

The HARQ-ACK may indicate an ACK or a NACK corresponding to one Code Block Group (CBG) included in the transport block.

The scheduling request may be at least used for requesting a resource of the PUSCH (or the UL-SCH) for initial transmission (new transmission). The scheduling request bit may be used for indicating either of a positive SR or a negative SR. The scheduling request bit indicating the positive SR is also referred to as "the positive SR being transmitted". The positive SR may indicate that a resource of the PUSCH (or the UL-SCH) for initial transmission is requested by the terminal apparatus 1. The positive SR may indicate that a scheduling request is triggered by a higher layer. The positive SR may be transmitted in a case that the higher layer indicates transmission of the scheduling request. The scheduling request bit indicating the negative SR is also referred to as "the negative SR being transmitted". The negative SR may indicate that a resource of the PUSCH (or the UL-SCH) for initial transmission is not requested by the terminal apparatus 1. The negative SR may indicate that the scheduling request is not triggered by the higher layer. The negative SR may be transmitted in a case that transmission of a scheduling request is not indicated by the higher layer.

Channel state information may include at least some or all of a Channel Quality Indicator (CQI), a Precoder Matrix Indicator (PMI), and a Rank Indicator (RI). The CQI is an indicator related to quality (for example, propagation strength) of a channel or quality of a physical channel, and the PMI is an indicator related to a precoder. The RI is an indicator related to a transmission rank (or the number of transmission layers).

The channel state information may be given based at least on reception of a physical signal (for example, a CSI-RS) at least used for channel measurement. The channel state information may be selected by the terminal apparatus 1; based at least on reception of the physical signal at least used for channel measurement. Channel measurement may include interference measurement.

The PUCCH may correspond to a PUCCH format. The PUCCH may be a set of resource elements used for conveying the PUCCH format. The PUCCH may include the PUCCH format.

The PUSCH may be used for transmitting a transport block and/or uplink control information. The PUSCH may be used for transmitting the transport block and/or the uplink control information corresponding to the UL-SCH. The PUSCH may be used for conveying the transport block and/or the uplink control information. The PUSCH may be used for conveying the transport block and/or the uplink control information corresponding to the UL-SCH. The transport block may be mapped to the PUSCH. The transport block corresponding to the UL-SCH may be mapped to the PUSCH. The uplink control information may be mapped to the PUSCH. The terminal apparatus 1 may transmit the PUSCH to which the transport block and/or the uplink control information is mapped. The base station apparatus 3 may receive the PUSCH to which the transport block and/or the uplink control information is mapped.

The PRACH may be used for transmitting a random access preamble. The PRACH may be used for conveying a random access preamble. A PRACH sequence $x_{u,v}(n)$ is defined by $x_{u,v}(n)=x_u(\mathrm{mod}(n+C_v, L_{RA}))$. $x_u$ may be a Zadoff-Chu (ZC) sequence. $x_u$ is defined by $x_u=\exp(-j\pi ui\ (i+1)/L_{RA})$. j is an imaginary unit. π is ratio of the circumference of a circle to its diameter. $C_v$ corresponds to a cyclic shift of the PRACH sequence. $L_{RA}$ corresponds to the length of the PRACH sequence, $L_{RA}$ is 839, or 139. i is an integer in the range from 0 to $L_{RA}-1$. u is a sequence index for the PRACH sequence. The terminal apparatus 1 may transmit the PRACH. The base station apparatus 3 may receive the PRACH.

For a certain PRACH occasion, 64 random access preambles are defined. Each of the random access preambles is identified (determined, given) based at least on the cyclic shift $C_v$ of the PRACH sequence and the sequence index u for the PRACH sequence. Each of the 64 identified random access preambles may be assigned an index, The uplink physical signal may correspond to a set of resource elements. The uplink physical signal need not carry information generated in a higher layer. The uplink physical signal may be a physical signal used in the uplink component carrier. The terminal apparatus 1 may transmit the uplink physical signal. The base station apparatus 3 may receive the uplink physical signal. In the uplink of the radio communication system according to an aspect of the present embodiment, at least a part or all of the following uplink physical signals may be used.

Uplink Demodulation Reference Signal (UL DMRS)
Sounding Reference Signal (SRS)
UpLink Phase Tracking Reference Signal (UL PTRS)

The UL DMRS is a general term for a DMRS for the PUSCH and a DMRS for the PUCCH.

A set of antenna ports of the DIVERS for the PUSCH (DMRS related to the PUSCH, DMRS included in the PUSCH, DMRS corresponding to the PUSCH) may be given based on a set of antenna ports for the PUSCH. In other words, the set of antenna ports of the DMRS for the PUSCH may be the same as a set of antenna ports of the PUSCH.

Transmission of the PUSCH and transmission of the DMRS for the PUSCH may be indicated (or may be scheduled) by one DCI format. The PUSCH and the DMRS for the PUSCH may be collectively referred to as a PUSCH. Transmission of the PUSCH may mean transmission of the PUSCH and the DMRS for the PUSCH.

The PUSCH may be inferred from the DMRS for the PUSCH. In other words, a channel (propagation path) of the PUSCH may be inferred from the DMRS for the PUSCH.

A set of antenna ports of the DMRS for the PUCCH (DMRS related to the PUCCH, DMRS included in the PUCCH, DMRS corresponding to the PUCCH) may be the same as a set of antenna ports of the PUCCH.

Transmission of the PUCCH and transmission of the DMRS for the PUCCH may be indicated (or may be triggered) by one DCI format. Mapping of the PUCCH to resource elements (resource element mapping) and/or mapping of the DMRS for the PUCCH to resource elements may be given by one PUCCH format. The PUCCH and the DMRS for the PUCCH may be collectively referred to as a PUCCH. Transmission of the PUCCH may mean transmission of the PUCCH and the DMRS for the PUCCH.

The PUCCH may be inferred from the DMRS for the PUCCH. In other words, a channel of the PUCCH may be inferred from the DMRS for the PUCCH.

The downlink physical channel may correspond to a set of resource elements for carrying information generated in a higher layer. The downlink physical channel may be a physical channel used in a downlink component carrier. The base station apparatus 3 may transmit the downlink physical channel. The terminal apparatus 1 may receive the downlink physical channel. In the downlink of the radio communication system according to an aspect of the present embodiment, at least a part or all of the following downlink physical channels may be used.

Physical Broadcast Channel (PBCH)
Physical Downlink Control Channel (PDCCH)
Physical Downlink Shared Channel (PDSCH)

The PBCH may be used for transmitting a Master Information Block (MIB) and/or physical layer control information. The PBCH may be transmitted for conveying (delivering, transmitting) the MIB and/or the physical layer control information. The BCH may be mapped to the PBCH. The terminal apparatus 1 may receive the PBCH to which the MIB and/or the physical layer control information is mapped. The base station apparatus 3 may transmit the PBCH to which the MIB and/or the physical layer control information is mapped. The physical layer control information is also referred to as a PBCH payload, or a PBCH payload related to timing. The MIB may include one or multiple higher layer parameters.

The physical layer control information includes 8 bits. The physical layer control information may at least include a part or all of the following 0A to 0D.

0A) Radio frame bit

0B) Half radio frame (half system frame, half frame) bit

0C) SS/PBCH block index bit

0D) Subcarrier offset bit

The radio frame bit is used for indicating a radio frame in which the PBCH is transmitted (radio frame including a slot in which the PBCH is transmitted). The radio frame bit includes 4 bits. The radio frame bit may include 4 bits of a 10-bit radio frame indicator. For example, the radio frame indicator may be at least used for identifying radio frames from index 0 to index 1023.

The half radio frame bit is used for indicating, out of the radio frame in which the PBCH is transmitted, which of the first five subframes or the last five subframes is used for transmission of the PBCH. Here, the half radio frame may include five subframes. The half radio frame may include the first five subframes out of the 10 subframes included in the radio frame. The half radio frame may include the last five subframes out of the 10 subframes included in the radio frame.

The SS/PBCH block index bit is used for indicating an SS/PBCH block index. The SS/PBCH block index bit includes 3 bits. The SS/PBCH block index bit may include 3 bits of a 6-bit SS/PBCH block index indicator. The SS/PBCH block index indicator may be at least used for identifying SS/PBCH blocks from index 0 to index 63.

The subcarrier offset bit is used for indicating a subcarrier offset. The subcarrier offset may be used for indicating a difference between the first subcarrier to which the PBCH is mapped and the first subcarrier to which the control resource set having an index of 0 is mapped.

The PDCCH may be used for transmitting Downlink Control Information (DCI). The PDCCH may be transmitted for conveying (delivering, transmitting) the downlink control information. The downlink control information may be mapped to the PDCCH. The terminal apparatus 1 may receive the PDCCH to which the downlink control information is mapped. The base station apparatus 3 may transmit the PDCCH to which the downlink control information is mapped.

The downlink control information may correspond to a DCI format. The downlink control information may be included in the DCI format. The downlink control information may be mapped to each field of the DCI format.

DCI format 0_0, DCI format 0_1, DCI format 1_0, and DCI format 1_1 are DCI formats including a set of fields different from each other. An uplink DCI format is a general term for DCI format 0_0 and DCI format 0_1. A downlink DCI format is a general term for DCI format 1_0 and DCI format 1_1.

DCI format 0_0 is at least used for scheduling the PUSCH of a certain cell (or mapped to a certain cell). DCI format 0_0 at least includes a part or all of fields from 1A to 1E.

1A) DCI format identification field (Identifier field for DCI formats)

1B) Frequency domain resource assignment field

1C) Time domain resource assignment field

1D) Frequency hopping flag field

1E) Modulation and Coding Scheme (MCS) field

The DCI format identification field may indicate whether the DCI format including the DCI format identification field is an uplink DCI format or a downlink DCI format. The DCI format identification field included in DCI format 0_0 may indicate 0 (or may indicate that DCI format 0_0 is an uplink DCI format).

The frequency domain resource assignment field included in DCI format 0_0 may be at least used for indicating assignment of frequency resources for the PUSCH.

The time domain resource assignment field included in DCI format 0_0 may be at least used for indicating assignment of time resources for the PUSCH.

The frequency hopping flag field may be at least used for indicating whether frequency hopping is applied to the PUSCH.

The MCS field included in DCI format 0_0 may be at least used for indicating a part or all of a modulation scheme for the PUSCH and/or a target coding rate. The target coding rate may be a target coding rate for the transport block of the PUSCH. The size of the transport block (Transport Block Size (TBS)) of the PUSCH may be given based at least on a part or all of the target coding rate and the modulation scheme for the PUSCH.

DCI format 0_0 need not include a field used for a CSI request. In other words, CSI need not be requested using DCI format 0_0.

DCI format 0_0 need not include a carrier indicator field. In other words, the uplink component carrier to which the PUSCH scheduled using DCI format 0_0 is mapped may be the same as the uplink component carrier to which the PDCCH including DCI format 0_0 is mapped.

DCI format 0_0 need not include the BWP field. In other words, the uplink BWP to which the PUSCH scheduled using DCI format 0_0 is mapped may be the same as the uplink BWP to which the PDCCH including DCI format 0_0 is mapped.

DCI format 0_1 is at least used for scheduling of the PUSCH of a certain cell (mapped to a certain cell). DCI format 0_1 at least includes a part or all of fields of 2A to 2H.

2A) DCI format identification field

2B) Frequency domain resource assignment field

2C) Uplink time domain resource assignment field

2D) Frequency hopping flag field

2E) MCS field

2F) CSI request field

2G) BWP field

2H) Carrier indicator field

The DCI format identification field included in DCI format 0_1 may indicate 0 (or may indicate that DCI format 0_1 is an uplink DCI format).

The frequency domain resource assignment field included in DCI format 0_1. may be at least used for indicating assignment of frequency resources for the PUSCH.

The time domain resource assignment field included in DCI format may be at least used for indicating assignment of time resources for the PUSCH.

The MCS field included in DCI format 0_1 may be at least used for indicating a part or all of a modulation scheme for the PUSCH and/or a target coding rate.

In a case that the BWP field is included in DCI format 0_1, the IMP field may be used for indicating an uplink BWP to which the PUSCH is mapped. In a case that the BWP field is not included in DCI format 0_1, the uplink BWP to which the PUSCH is mapped may be the same as the uplink BWP to which the PDCCH including DCI format 0_1 used for scheduling of the PUSCH is mapped. In a case that the number of uplink BWPs configured for the terminal apparatus 1 in a certain uplink component carrier is two or more, the number of bits of the BWP field included in DCI format 0_1 used for scheduling of the PUSCH mapped to the certain uplink component carrier may be 1 bit or more. In a case that the number of uplink MVPs configured for the terminal apparatus 1 in a certain uplink component carrier is one, the number of bits of the BWP field included in DCI format 0_1 used for scheduling of the PUSCH mapped to the certain uplink component carrier may be 0 bits (or the BWP field need not be included in DCI format 0_1 used for scheduling of the PUSCH mapped to the certain uplink component carrier).

The CSI request field is at least used for indicating the report of the CSI.

In a case that the carrier indicator field is included in DCI format 0_1, the carrier indicator field may be used for indicating the uplink component carrier to which the PUSCH is mapped. In a case that the carrier indicator field is not included in DCI format the uplink component carrier to which the PUSCH is mapped may be the same as the uplink component carrier to which the PDCCH including DCI format 0_1 used for scheduling of the PUSCH is mapped. In a case that the number of uplink component carriers configured for the terminal apparatus 1 in a certain serving cell group is two or more (case that uplink carrier aggregation is operated in a certain serving cell group), the number of bits of the carrier indicator field included in DCI format 0_1 used for scheduling of the PUSCH mapped to the certain serving cell group may be 1 bit or more (for example, 3 bits). In a case that the number of uplink component carriers configured for the terminal apparatus 1 in a certain serving cell group is one (case that uplink carrier aggregation is not operated in a certain serving cell group), the number of bits of the carrier indicator field included in DCI format 0_1 used for scheduling of the PUSCH mapped to the certain serving cell group may be 0 bits (or the carrier indicator field need not be included in DCI format 0_1 used for scheduling of the PUSCH mapped to the certain serving cell group).

DCI format 1_0 is at least used for scheduling of the PDSCH of a certain cell (mapped to a certain cell). DCI format 1_0 at least includes a part or all of 3A to 3F.

3A) DCI format identification field

3B) Frequency domain resource assignment field

3C) Time domain resource assignment field

3D) MCS field

3E) PDSCH_HARQ feedback timing indication field (PDSCH to HARQ feedback timing indicator field)

3F) PUCCH resource indication field (PUCCH resource indicator field)

The DCI format identification field included in DCI format 1_0 may indicate 1 (or may indicate that DCI format 1_0 is a downlink DCI format).

The frequency domain resource assignment field included in DCI format 1_0 may be at least used for indicating assignment of frequency resources for the PDSCH.

The time domain resource assignment field included in DCI format 1_0 may be at least used for indicating assignment of time resources for the PDSCH.

The MCS field included in DCI format 1_0 may be at least used for indicating a part or all of a modulation scheme for the PDSCH and/or a target coding rate. The target coding rate may be a target coding rate for the transport block of the PDSCH. The size of the transport block (Transport Block Size (TBS)) of the PDSCH may be given based at least on a part or all of the target coding rate and the modulation scheme for the PDSCH.

The PDSCH_HARQ feedback timing indication field may be at least used for indicating an offset from the slot including the last OFDM symbol of the PDSCH to the slot including the first OFDM symbol of the PUCCH.

The PUCCH resource indication field may be a field indicating an index of one of one or multiple PUCCH resources included in a PUCCH resource set. The PUCCH resource set may include one or multiple PUCCH resources.

DCI format 1_0 need not include the carrier indicator field. In other words, the downlink component carrier to which the PDSCH scheduled using DCI format 1_0 is mapped may be the same as the downlink component carrier to which the PDCCH including DCI format 1_0 is mapped.

DCI format 1_0 need not include the BWP field. In other words, the downlink BWP to which the PDSCH scheduled using DCI format 1_0 is mapped may be the same as the downlink BWP to which the PDCCH including DCI format 1_0 is mapped.

DCI format 1_1 is at least used for scheduling the PDSCH of a certain cell (or mapped to a certain cell). DCI format 1_1 at least includes a part or all of 4A to 4I.

4A) DCI format identification field

4B) Frequency domain resource assignment field

4C) Time domain resource assignment field

4E) MCS field

4F) PDSCH_HARQ feedback timing indication field

4G) PUCCH resource indication field

4H) BWP field

4I) Carrier indicator field

The DCI format identification field included in DCI format 1_1 may indicate indicate that DCI format 1_1 is a downlink DCI format).

The frequency domain resource assignment field included in DCI format 1_1 may be at least used for indicating assignment of frequency resources for the PDSCH.

The time domain resource assignment field included in DCI format 1_1 may be at least used for indicating assignment of time resources for the PDSCH.

The MCS field included in DCI format 1_1 may be at least used for indicating a part or all of the modulation scheme for the PDSCH and/or the target coding rate.

In a case that the PDSCH HARQ feedback timing indication field is included in DCI format 1_1, the PDSCH HARQ feedback timing indication field may be at least used for indicating an offset from the slot including the last OFDM symbol of the PDSCH to the slot including the first OFDM symbol of the PUCCH. In a case that the PDSCH HARQ feedback timing indication field is not included in DCI format 1_1, an offset from the slot including the last OFDM symbol of the PDSCH to the slot including the first OFDM symbol of the PUCCH may be identified by a higher layer parameter.

The PUCCH resource indication field may be a field indicating an index of one of one or multiple PUCCH resources included in a PUCCH resource set.

In a case that the BWP field is included in DCI format 1_1, the BWP field may be used for indicating the downlink BWP to which the PDSCH is mapped. In a case that the BWP field is not included in DCI format 1_1, the downlink BWP to which the PDSCH is mapped may be the same as the downlink BWP to which the PDCCH including DCI format 1_1 used for scheduling of the PDSCH is mapped. In a case that the number of downlink BWPs configured for the terminal apparatus 1 in a certain downlink component carrier is two or more, the number of bits of the BWP field included in DCI format 1_1 used for scheduling of the PDSCH mapped to the certain downlink component carrier may be 1 bit or more. In a case that the number of downlink BWPs configured for the terminal apparatus 1 in a certain downlink component carrier is one, the number of bits of the BMP field included in DCI format 1_1 used for scheduling of the PDSCH mapped to the certain downlink component carrier may be 0 bits (or the BWP field need not be included in DCI format 1_1 used for scheduling of the PDSCH mapped to the certain downlink component carrier).

In a case that the carrier indicator field is included in format 1_1, the carrier indicator field may be used for indicating the downlink component carrier to which the PDSCH is mapped. In a case that the carrier indicator field is not included in format 1_1, the downlink component carrier to which the PDSCH is mapped may be the same as the downlink component carrier to which the PDCCH including DCI format 1_1 used for scheduling of the PDSCH is mapped. In a case that the number of downlink component carriers configured for the terminal apparatus 1 in a certain serving cell group is two or more (case that downlink carrier aggregation is operated in a certain serving cell group), the number of bits of the carrier indicator field included in DCI format 1_1 used for scheduling of the PDSCH mapped to the certain serving cell group may be 1 bit or more (for example, 3 bits). In a case that the number of downlink component carriers configured for the terminal apparatus 1 in a certain serving cell group is one (case that downlink carrier aggregation is not operated in a certain serving cell group), the number of bits of the carrier indicator field included in DCI format 1_1 used for scheduling of the PDSCH mapped to the certain serving cell group may be 0 bits (or the carrier indicator field need not be included in DCI format 1_1 used for scheduling of the PDSCH mapped to the certain serving cell group).

The PDSCH may be used for transmitting the transport block. The PDSCH may be used for transmitting the transport block corresponding to the DL-SCH. The PDSCH may be used for conveying the transport block. The PDSCH may be used for conveying the transport block corresponding to the DL-SCH. The transport block may be mapped to the PDSCH. The transport block corresponding to the DL-SCH may be mapped to the PDSCH. The base station apparatus 3 may transmit the PDSCH The terminal apparatus 1 may receive the PDSCH.

The downlink physical signal may correspond to a set of resource elements. The downlink physical signal need not carry information generated in a higher layer. The downlink physical signal may be a physical signal used in the downlink component carrier. The downlink physical signal may be transmitted by the base station apparatus 3. The downlink physical signal may be transmitted by the terminal apparatus 1. In the downlink of the radio communication system according to an aspect of the present embodiment, at least a part or all of the following downlink physical signals may be used.

Synchronization Signal (SS)

Downlink DeModulation Reference Signal (DL DMRS)

Channel State Information-Reference Signal (CSI-RS)

Downlink Phase Tracking Reference Signal (DL PTRS)

The synchronization signal may be at least used for the terminal apparatus 1 to establish synchronization of the frequency domain and/or the time domain in the downlink. The synchronization signal is a general term for the Primary Synchronization Signal (PSS) and the Secondary Synchronization Signal (SSS).

Figure 7:
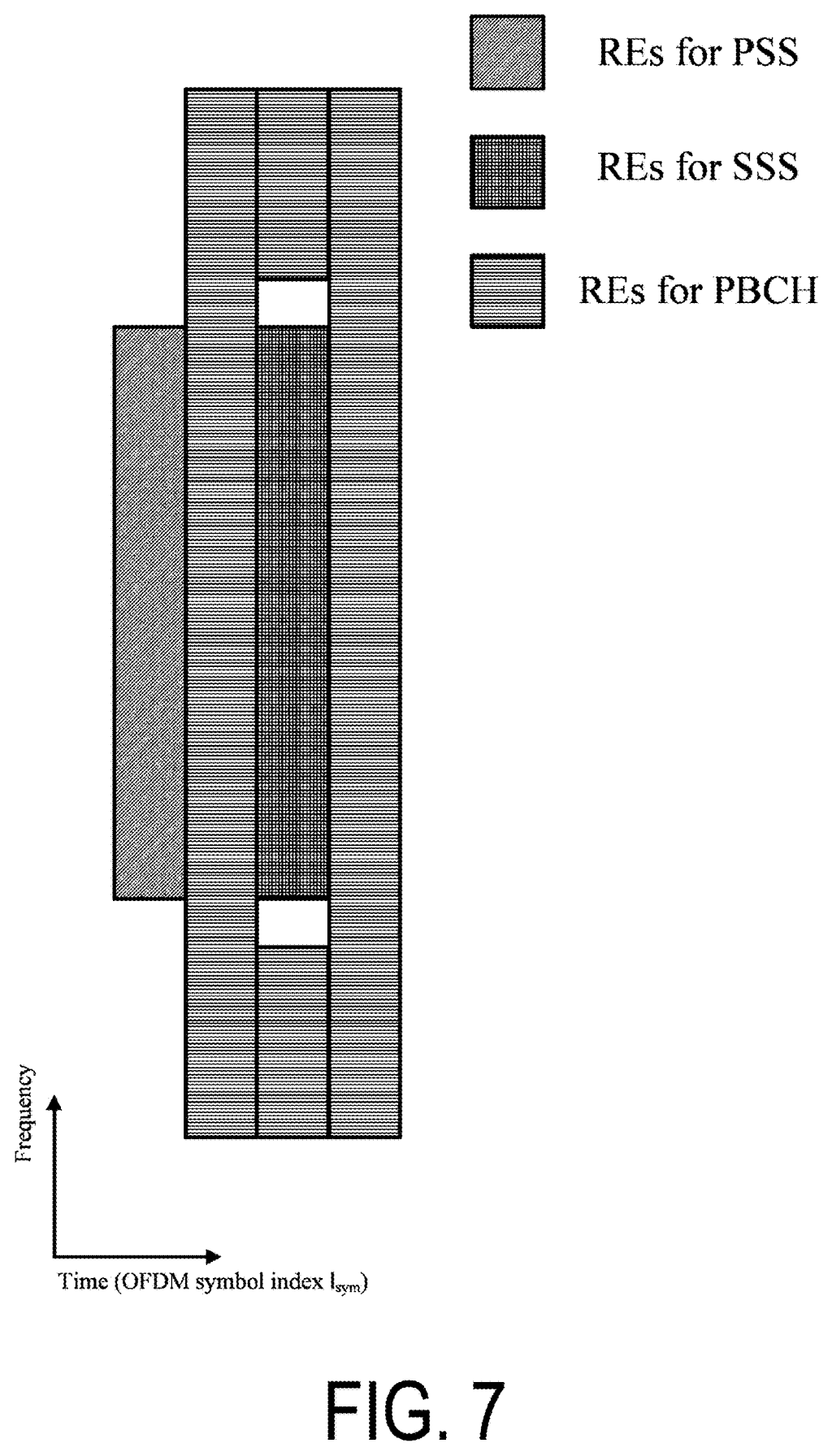

FIG. 7 is a diagram illustrating a configuration example of the SS/PBCH block according to an aspect of the present embodiment. In FIG. 7, the horizontal axis corresponds to a time axis (OFDM symbol index $I_{sym}$), and the vertical axis represents the frequency domain. The block hatched with diagonal lines represents a set of resource elements for the PSS. The block hatched with grid lines represents a set of resource elements for the SSS. The block hatched with horizontal lines represents a set of resource elements for the PBCH and the DMRS for the PBCH (DMRS related to the PBCH, DMRS included in the PBCH, DMRS corresponding to the PBCH).

As illustrated in FIG. 7, the SS/PBCH block includes the PSS, the SSS, and the PBCH. The SS/PBCH block includes four continuous OFDM symbols. The SS/PBCH block includes 240 subcarriers. The PSS is mapped to the 57th to 183rd subcarriers in the first OFDM symbol. The SSS is mapped to the 57th to 183rd subcarriers in the third OFDM symbol. Zero may be set to the 1st to 56th subcarriers of the first OFDM symbol. Zero may be set to the 184th to 240th subcarriers of the first OFDM symbol. Zero may be set to the 49th to 56th subcarriers of the third OFDM symbol. Zero may be set to the 184th to 192nd subcarriers of the third OFDM symbol. The PBCH is mapped to subcarriers which are the 1st to 240th subcarriers of the second OFDM symbol and to which the DMRS for the PBCH is not mapped. The PBCH is mapped to subcarriers which are the 1st to 48th subcarriers of the third OFDM symbol and to which the DMRS for the 1'BCH is not mapped. The PBCH is mapped to subcarriers which are the 193rd to 240th subcarriers of the third OFDM symbol and to which the DMRS for the PBCH is not mapped. The PBCH is mapped to subcarriers which are the 1st to 240th subcarriers of the fourth OFDM symbol and to which the DMRS for the PBCH is not mapped.

The PSS, the SSS, the PBCH, and the antenna port of the DMRS for the PBCH may be the same.

The PBCH on which the symbol of the PBCH in a certain antenna port is conveyed may be inferred from the DMRS for the PBCH mapped to the slot to which the PBCH is mapped and for the PBCH included in the SS/PBCH block including the PBCH.

The DL DMRS is a general term for a DMRS for the PBCH, a DMRS for the PDSCH, and a DMRS for the PDCCH.

A set of antenna ports of the DMRS for the PDSCH (DMRS related to the PDSCH, DMRS included in the PDSCH, DMRS corresponding to the PDSCH) may be given based on a set of antenna ports for the PDSCH. In other words, the set of antenna ports of the DMRS for the PDSCH may be the same as the set of antenna ports for the PDSCH.

Transmission of the PDSCH and transmission of the DMRS for the PDSCH may be indicated (or may be scheduled) by one DCI format. The PDSCH and the DMRS for the PDSCH may be collectively referred to as a PDSCH. Transmission of the PDSCH may be transmission of the PDSCH and the DMRS for the PDSCH.

The PDSCH may be inferred from the DMRS for the PDSCH. In other words, a channel of the PDSCH may be inferred from the DMRS for the PDSCH. In a case that a set of resource elements in which the symbol of a certain PDSCH is conveyed and a set of resource elements in which the symbol of the DMRS for the certain PDSCH is conveyed are included in the same Precoding Resource Group (PRG), the PDSCH on which the symbol of the PDSCH in a certain antenna port is conveyed may be inferred from the DMRS for the PDSCH.

The antenna port of the DMRS for the PDCCH (DMRS related to the PDCCH, DMRS included in the PDCCH, DMRS corresponding to the PDCCH) may be the same as the antenna port for the PDCCH.

The PDCCH may be inferred from the DMRS for the PDCCH. In other words, a channel of the PDCCH may be inferred from the DMRS for the PDCCH. In a case that the same precoder is (assumed to be) applied to a set of resource elements in which the symbol of a certain PDCCH is conveyed and a set of resource elements in which the symbol of the DMRS for the certain PDCCH is conveyed, the PDCCH on which the symbol of the PDCCH in a certain antenna port is conveyed may be inferred from the DMRS for the PDCCH.

A Broadcast CHannel (BCH), an Uplink-Shared CHannel (UL-SCH), and a Downlink-Shared CHannel (DL-SCH) are transport channels. A channel used in the MAC layer is referred to as a transport channel. A unit of the transport channel used in the MAC layer is also referred to as a transport block (TB) or a MAC Protocol Data Unit (PDU). Control of the Hybrid Automatic Repeat reQuest (HARQ) is performed for each transport block in the MAC layer. The transport block is a unit of data that the MAC layer delivers to the physical layer. In the physical layer, the transport block is mapped to a codeword and modulation processing is performed for each codeword.

For each serving cell, one UL-SCH and one DL-SCH may be given. The BCH may be given to the PCell. The BCH need not be given to the PSCell and the SCell.

A Broadcast Control CHannel (BCCH), a Common Control CHannel (CCCH), and a Dedicated Control CHannel (DCCH) are logical channels. For example, the BCCH is a channel of the RRC layer used for transmitting the MIB or system information. A Common Control CHannel (CCCH) may be used for transmitting a common RRC message in multiple terminal apparatuses 1. Here, the CCCH may be, for example, used for the terminal apparatus 1 that is not in a state of RRC connection. A Dedicated Control CHannel (DCCH) may be at least used for transmitting a dedicated. RRC message to the terminal apparatus 1. Here, the DCCH may be, for example, used for the terminal apparatus 1 that is in a state of RRC connection.

The RRC message includes one or multiple RRC parameters (information elements). For example, the RRC message may include the NUB. The RRC message may include the system information. The RRC message may include a message corresponding to the CCCH. The RRC message may include a message corresponding to the DCCH. The RRC message including a message corresponding to the DCCH is also referred to as a specific RRC message.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to the PUSCH in the physical channel. The DL-SCH in the transport channel may be mapped to the PDSCH in the physical channel. The BCH in the transport channel may be mapped to the PBCH in the physical channel.

The higher layer parameter is a parameter included in the RRC message or a Medium Access Control Control Element (MAC CE). In other words, the higher layer parameter is a general term for a MIB, system information, a message corresponding to the CCCH, a message corresponding to the DCCH, and parameters included in the MAC CE. The parameters included in the MAC CE are transmitted by a MAC Control Element (CE) command.

Procedures performed by the terminal apparatus 1 at least include a part or all of the following 5A to 5C.

5A) Cell search

5B) Random access

5C) Data communication

The cell search is a procedure in which synchronization with a certain cell related to the time domain and the frequency domain is performed by the terminal apparatus 1, which is used. for detecting a physical cell identity (physical cell ID). In other words, the terminal apparatus 1 may perform synchronization with a certain cell in the time domain and the frequency domain by means of cell search, and detect a physical cell ID.

A sequence of the PSS is given based at least on the physical cell ID. A sequence of the SSS is given based at least on the physical cell ID.

An SS/PBCH block candidate indicates a resource allowed to (possible to, scheduled to, configured to, defined to, having a possibility to) transmit the SS/PBCH block.

A set of SS/PBCH block candidates in a certain half radio frame is also referred to as an SS burst set. The SS burst set is also referred to as a transmission window, an SS transmission window, or a Discovery Refeence Signal transmission window (DRS transmission window). The SS burst set is a general term at least including a first SS burst set and a second SS burst set.

The base station apparatus 3 transmits SS/PBCH blocks with one or multiple indexes in a prescribed period. The terminal apparatus 1 may detect at least one SS/PBCH block out of the SS/PBCH blocks with one or multiple indexes, and attempt decoding of the PBCH included in the SS/PBCH block.

The random access is a procedure at least including a part or all of a message 1, a message 2, a message 3, and a message 4.

The message 1 is a procedure in which the PRACH is transmitted by the terminal apparatus 1. The terminal apparatus 1 transmits the PRACH in one PRACH occasion selected out of one or multiple PRACH occasions, based at least on the index of the SS/PBCH block candidate detected based on cell search. Each of the PRACH occasions is defined based at least on resources in the time domain and the frequency domain.

The terminal apparatus 1 transmits one random access preamble selected out of the PRACH occasion corresponding to the index of the SS/PBCH block candidate in which the SS/PBCH block is detected.

The message 2 is a procedure in which detection of DCI format 1_0 with a Cyclic Redundancy Check (CRC) scrambled with a Random Access-Radio Network Temporary Identifier (RA-RNTI) by the terminal apparatus 1 is attempted. The terminal apparatus 1 attempts detection of the PDCCH including the DCI format in a control resource set given based on the MIB included in the PBCH included in the SS/PBCH block detected based on cell search, and resources indicated based on a configuration of a search space set. The message 2 is also referred to as a random access response.

The message 3 is a procedure in which the PUSCH scheduled using a random access response grant included in DCI format 1_0 detected through the procedure of the message 2 is transmitted. Here, the random access response grant is indicated by the MAC CE included in the PDSCH scheduled using DCI format 1_0.

The PUSCH scheduled based on the random access response grant is one of a message 3 PUSCH or a PUSCH. The message 3 PUSCH includes a contention resolution identifier (contention resolution ID) MAC CE. The contention resolution ID MAC CE includes a contention resolution ID.

Retransmission of the message 3 PUSCH is scheduled using DCI format 0_0 with a CRC scrambled based on a Temporary Cell-Radio Network Temporary Identifier (TC-RNTI).

The message 4 is a procedure in which detection of DCI format 1_0 with a CRC scrambled based on either of a Cell-Radio Network Temporary identifier (C-RNTI) or a TC-RNTI is attempted. The terminal apparatus 1 receives the PDSCH scheduled based on DCI format 1_0. The PDSCH may include a contention resolution ID.

Data communication is a general term for downlink communication and uplink communication.

In data communication, the terminal apparatus 1 attempts detection of the PDCCH (monitors the PDCCH) in a control resource set and resources identified based on a search space set.

The control resource set is a set of resources including a certain number of resource blocks and a certain number of OFDM symbols. In the frequency domain, the control resource set may include continuous resources (non-interleaved mapping), or may include distributed resources (interleaver mapping).

A set of resource blocks constituting the control resource set may be indicated by a higher layer parameter. The number of OFDM symbols constituting the control resource set may be indicated by a higher layer parameter.

The terminal apparatus 1 attempts detection of the PDCCH in a search space set. Here, an attempt to detect the PDCCH in the search space set may be an attempt to detect a candidate of the PDCCH in the search space set, may be an attempt to detect a DCI format in the search space set, may be an attempt to detect the PDCCH in the control resource set, may be an attempt to detect a candidate of the PDCCH in the control resource set, or may be an attempt to detect a DCI format in the control resource set.

The search space set is defined as a set of candidates of the PDCCH. The search space set may be a Common Search Space (CSS) set, or may be a UE-specific Search Space (USS) set. The terminal apparatus 1 attempts detection of candidates of the PDCCH in a part or all of a Type 0 PDCCH common search space set, a Type 0a PDCCH common search space set, a Type 1 PDCCH common search space set, a Type 2 PDCCH common search space set, a Type 3 PDCCH common search space set, and/or a UE-specific PDCCH search space set (UE-specific search space set).

The Type 0 PDCCH common search space set may be used as a common search space set having an index of 0. The Type 0 PDCCH common search space set may be a common search space set having an index of 0.

The CSS set is a general term for the Type 0 PDCCH common search space set, the Type 0a PDCCH common search space set, the Type 1 PDCCH common search space set, the Type 2 PDCCH common search space set, and the Type 3 PDCCH common search space set. The USS set is also referred to as a UE specific PDCCH search space set.

A certain search space set is related to (included in, corresponds to) a certain control resource set. The index of the control resource set related to the search space set may be indicated by a higher layer parameter.

For a certain search space set, a part or all of 6A to 6C may be indicated by at least a higher layer parameter.

6A.) Monitoring interval of the PDCCH (PDCCH monitoring periodicity)

6B) Monitoring pattern of the PDCCH in a slot (PDCCH monitoring pattern within a slot)

6C) Monitoring offset of the PDCCH (PDCCH monitoring offset)

The monitoring occasion of a certain search space set may correspond to the OFDM symbol to which the first OFDM symbol of the control resource set related to the certain search space set is mapped. The monitoring occasion of a certain search space set may correspond to a resource of the control resource set starting from the first OFDM symbol of the control resource set related to the certain search space set. The monitoring occasion of the search space set is given based at least on a part or all of the monitoring interval of the PDCCH, the monitoring pattern of the PDCCH in a slot, and the monitoring offset of the PDCCH.

Figure 8:
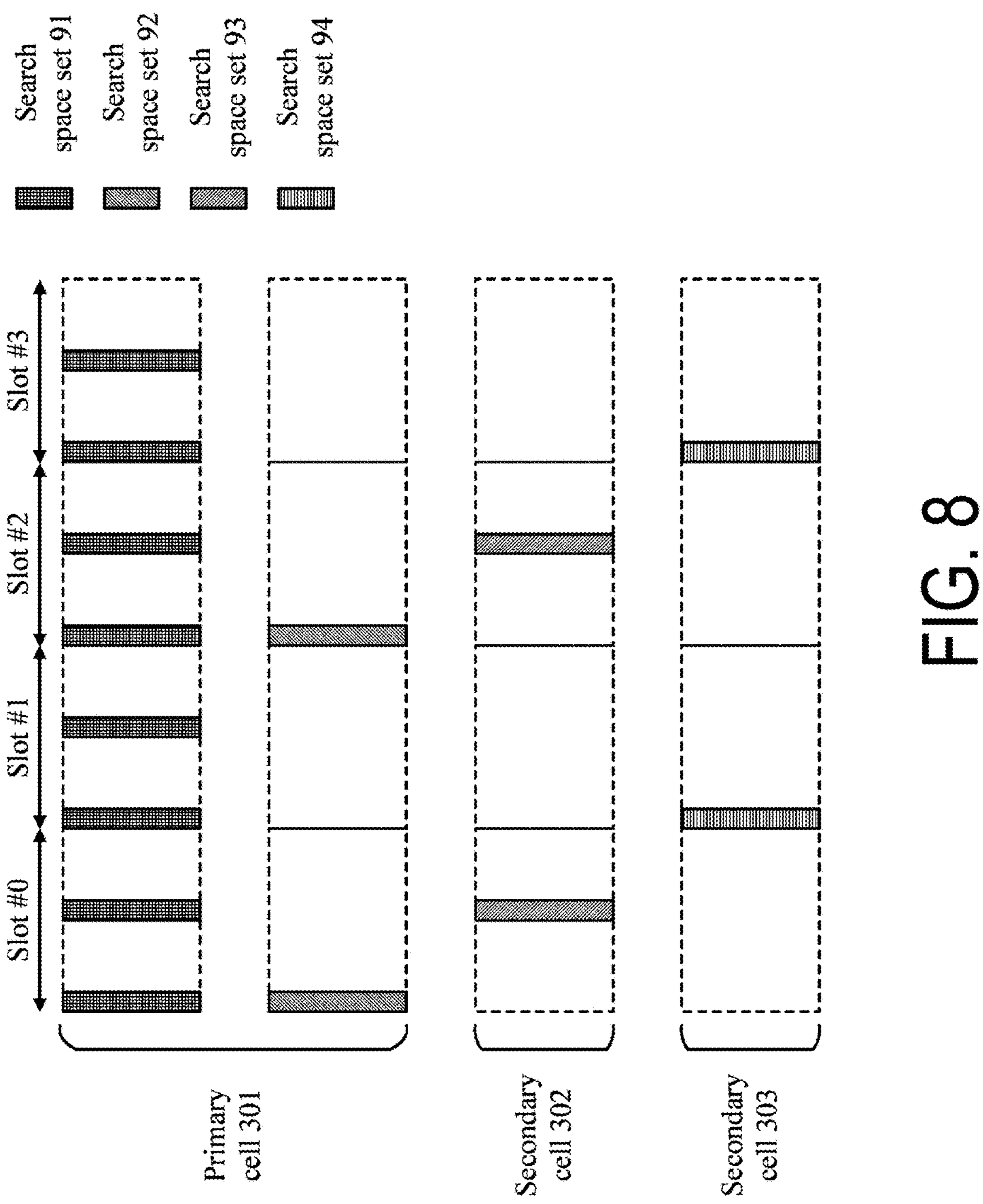
FIG. 8 is a diagram illustrating an example of monitoring occasions for search space sets according to an aspect of the present embodiment.

FIG. 8 is a diagram illustrating an example of the monitoring occasions for the search space sets according to an aspect of the present embodiment. In FIG. 8, a search space set 91 and a search space set 92 are configured in a primary cell 301, a search space set 93 is configured in a secondary cell 302, and a search space set 94 is configured in a secondary cell 303.

In FIG. 8, each block hatched with grid lines represents the search space set 91, each block hatched with lines rising diagonally up and to the right represents the search space set 92, each block hatched with lines rising diagonally up and to the left represents the search space set 93, and each block hatched with horizontal lines represents the search space set 94.

The monitoring periodicity of the search space set 91 is set to one slot, the monitoring offset of the search space set 91 is set to zero slots, and the monitoring pattern of the search space set 91 is set to [1, 0, 0, 0, 0, 0, 0, 1, 0, 0, 0, 0, 0]. In other words, the monitoring occasion for the search space set 91 corresponds to the first OFDM symbol (OFDM symbol π0) and the eighth OFDM symbol (OFDM symbol #7) in each of the slots.

The monitoring periodicity of the search space set 92 is set to two slots, the monitoring offset of the search space set 92 is set to zero slots, and the monitoring pattern of the search space set 92 is set to [1, 0, 0, 0, 0. 0, 0, 0, 0, 0, 0, 0, 0. 0]. In other words, the monitoring occasion for the search space set 92 corresponds to the first OFDM symbol (OFDM symbol #0) in each of the even-numbered slots.

The monitoring periodicity of the search space set 93 is set to two slots, the monitoring offset of the search space set 93 is set to zero slots, and the monitoring pattern of the search space set 93 is set to [0, 0, 0, 0, 0, 0, 0, 1, 0, 0, 0, 0, 0, 0]. In other words, the monitoring occasion for the search space set 93 corresponds to the eighth OFDM symbol (OFDM symbol #7) in each of the even-numbered slots.

The monitoring periodicity of the search space set 94 is set to two slots, the monitoring offset of the search space set 94 is set to one slot, and the monitoring pattern of the search space set 94 is set to [1, 0, 0, 0. 0, 0, 0, 0, 0, 0, 0, 0, 0, 0]. In other words, the monitoring occasion for the search space set 94 corresponds to the first OFDM symbol (OFDM symbol #0) in each of the odd-numbered slots.

The Type 0 PDCCH common search space set may be at least used for the DCI format with a Cyclic Redundancy Check (CRC) sequence scrambled with a System Information-Radio Network Temporary Identifier (SI-RNTI).

The Type 0a PDCCH common search space set may be at least used for the DCI format with a Cyclic Redundancy Check (CRC) sequence scrambled with a System Information-Radio Network Temporary Identifier (SI-RNTI).

The Type 1 PDCCH common search space set may be at least used for the DCI format with a CRC sequence scrambled with a Random Access-Radio Network Temporary Identifier (RA-RNTI) and/or a CRC sequence scrambled with a Temporary Cell-Radio Network Temporary Identifier (TC-RNTI).

The Type 2 PDCCH common search space set may be used for the DCI format with a CRC sequence scrambled with a Paging-Radio Network Temporary Identifier (P-RNTI).

The Type 3 PDCCH common search space set may be used for the DCI format with a CRC sequence scrambled with a Cell-Radio Network Temporary Identifier (C-RNTI).

The UE-specific PDCCH search space set may be at least used for the DCI format with a CRC sequence scrambled with a C-RNTI.

In downlink communication, the terminal apparatus 1 detects a downlink DCI format. The detected downlink DCI format is at least used for resource assignment of the PDSCH. The detected downlink DCI format is also referred to as downlink assignment. The terminal apparatus 1 attempts reception of the PDSCH. Based on the PUSCH resource indicated based on the detected downlink DCI format, the HARQ-ACK corresponding to the PDSCH (HARQ-ACK corresponding to the transport block included in the PDSCH) is reported to the base station apparatus 3.

In uplink communication, the terminal apparatus 1 detects an uplink DCI format. The detected DCI format is at least used for resource assignment of the PUSCH. The detected uplink DCI format is also referred to as an uplink grant. The terminal apparatus 1 performs transmission of the PUSCH.

In configured scheduling (configured grant), the uplink grant for scheduling the PUSCH is configured for each transmission period of the PUSCH. A part or all of pieces of information indicated by the uplink DCI format in a case that the PUSCH is scheduled by the uplink DCI format may be indicated by the uplink grant configured in a case of the configured scheduling.

Figure 9:
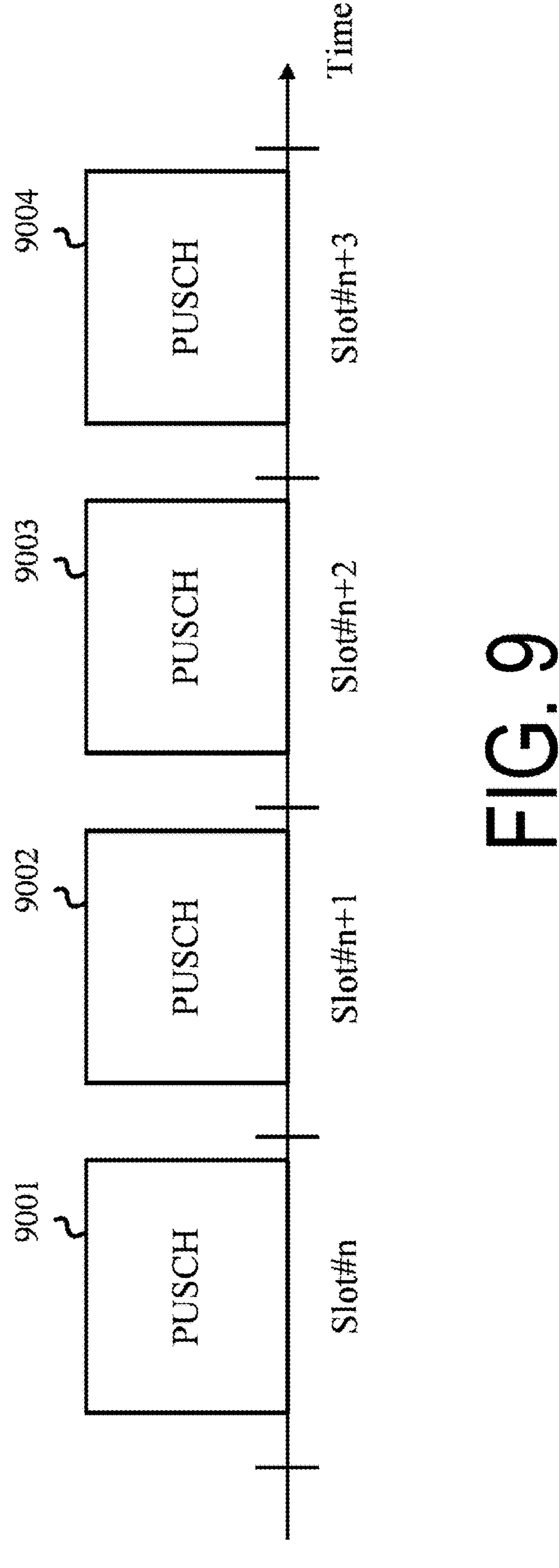
FIG. 9 is a diagram illustrating an example of a first repetition type of PUSCH according to an aspect of the present embodiment.

FIG. 9 is a diagram illustrating an example of a first repetition type of PUSCH according to an aspect of the present embodiment. In FIG. 9, the horizontal axis indicates the time domain. A grid line of the horizontal axis indicates a boundary between slots. A slot at the left end in FIG. 9 is slot #n, and slot indexes are assigned in ascending order in the time domain. A PUSCH is mapped to each slot. Specifically, a PUSCH 9001 is mapped to slot #n, a PUSCH 9002 is mapped to slot #n+1, a PUSCH 9003 is mapped to slot #n+2, and a PUSCH 9004 is mapped to slot #n+3.

Here, the first repetition type of the PUSCH includes configuration with the number of repetitions being 1. In other words, the first repetition type of the PUSCH includes configuration in which one PUSCH is mapped to one slot.

9000 indicates a range of time domain resource assignment of the PUSCH 9001. For example, the range of time domain resource assignment may be provided by the time domain resource assignment field included in the DCI format used for scheduling of the PUSCH 9001, The range of time domain resource assignment may be provided by an RRC parameter.

In the first repetition type of the PUSCH, in addition to the range of time domain resource assignment, the number of repetitions may be provided. For example, information indicating the number of repetitions may be provided by a field included in the DCI format used for scheduling of the PUSCH. The information indicating the number of repetitions may be provided by an RRC parameter.

In the first repetition type of the PUSCH, the range of time domain resource assignment indicates the range of time domain resource assignment per slot. In other words, in a case that the PUSCHs are mapped to multiple slots, the range of time domain resource assignment indicates the range of time domain resource assignment of each PUSCH to each of the multiple slots. For example, in a case that the range of time domain resource assignment indicates information of {S, L} the time domain resources of L OFDM symbols may be assigned from OFDM symbol #S to each of the multiple slots determined by the provided number of repetitions. In the example of FIG. 9, an example of S=2 and L=10 is illustrated. Here, S indicates an index of a first OFDM symbol of the PUSCH. L indicates the number of OFDM symbols of the PUSCH.

In FIG. 9, 9000 indicates the range of time domain resource assignment in slot #n of the PUSCH 9001, the range of time domain resource assignment in slot #n+1 of the PUSCH 9002, the range of time domain resource assignment in slot #n+2 of the PUSCH 9003, and the range of time domain resource assignment in slot #n+3 of the PUSCH 9004.

The TBS of the transport block included in the PUSCH is determined with a first determination method. The first determination method is a determination method in which the TBS is determined based at least on the amount of resources of the PUSCH per slot and a target coding rate R. Here, the amount of resources of the PUSCH per slot is determined based at least on the range of time domain resource assignment. For example, the amount of resources of the PUSCH per slot may be determined based at least on L out of information indicating the range of time domain resource assignment.

For example, the first determination method for the TBS may at least include a part or all of the following procedure 1 to procedure 3:

Procedure 1) determine $N_{RE}$;

Procedure 2) determine an intermediate value of information bits (Intermediate number of information bits) $N_{info}=N_{RE}\cdot R\cdot Q_{m\cdot v}$;

Procedure 3) determine the size of the transport block.

Procedure 1 may additionally at least include a part or all of procedure 1a and procedure 1b:

Procedure 1a) determine $N^{a}_{RE}=N^{RB}_{sc}\cdot N^{sh}_{symb}-N^{PRB}_{DMRS}-N^{PRB}_{oh}$;

Procedure 1b) determine $N_{RE}=\min(X1, N^{a}_{RE})\cdot n_{PRB}$.

In procedure 1a, $N^{sh}_{symb}$ indicates the number of OFDM symbols of the PUSCH. For example, $N^{sh}_{symb}$ may be determined based at least on L. For example, $N^{sh}_{symb}$ may be L. $N^{PRB}_{DMRS}$ is an overhead value, with the resource element to which the DMRS for the PUSCH is mapped being taken into consideration. $N^{PRB}_{DMRS}$ may be the number of resource elements to which the DMRS is mapped per PRB in the OFDM symbol assigned for the PUSCH. $N^{PRB}_{oh}$ is a value that can take overhead caused due to elements other than the MARS for the PUSCH into consideration. Here, the overhead caused due to elements other than the DIVERS may at least include overhead caused due to mapping of the control resource set or overhead caused due to mapping of the CSI-RS. For example, $N^{PRB}_{oh}$ may be provided by an RRC parameter. Also in a case that the terminal apparatus 1 stores $N^{PRB}_{oh}$, it may be assumed that $N^{PRB}_{oh}$ is 0 in transmission of a message 3 PUSCH. In a case that the terminal apparatus 1 does not store $N^{PRB}_{oh}$, it may be assumed that $N^{PRB}_{oh}$ in transmission of the PUSCH.

For example, in procedure 1b, near may be the number of resource blocks assigned for the PUSCH. For example, X1 may be 156.

For example, procedure 1 may be a procedure in which the amount of resources of the PUSCH is calculated based at least on L. For example, the amount of resources of the PUSCH may be a reference amount that is different from the actual amount of resources. The amount of resources of the PUSCH may be equal to the actual amount of resources. The amount of resources of the PUSCH may be used for determination of the TBS, with which an effective coding rate close to the target coding rate R is achieved.

In procedure 2, R is a target coding rate determined based on a value of the MCS field included in the uplink grant. In procedure 2, $Q_m$ is modulation order of a modulation scheme of the PUSCH. In procedure 2, v is the number of layers of the PUSCH. The number of layers is also referred to as spatial multiplexing number. In other words, the number of layers may be that of spatial streams.

In other words, in procedure 2, the intermediate value $N_{info}$ of information bits corresponding to the target coding rate R may be determined.

Procedure 3 is a procedure in which the TBS is determined based on $N_{info}$. For example, in procedure 3, procedure 3a and procedure 3c may be switched based on the value of $N_{info}$. For example, in a case that the value of $N_{info}$ is equal to or smaller than a prescribed value, procedure 3a may be performed. In a case that the value of $N_{info}$ exceeds the prescribed value, procedure 3c may be performed. Here, for example, the prescribed value may be 3824.

In procedure 3a, $N^{a}_{info}$ is given based on $N^{a}_{info}$=max(24, floor($N_{info}$/2^n)·2^n). In procedure 3a, n max(3, floor($N_{info}$)−6).

For example, after procedure 3a is performed, procedure 3b may be performed.

In procedure 3b, one value is selected out of candidate values for the size of the transport block included in a prescribed table. Here, as the candidate values for the TBS, the prescribed table may at least include a part or all of 24, 32, 40, 48, 56, 64, 72, 80, 88, 96, 104, 112, 120, 128, 136, 144, 152 160, 168, 176, 184, 192, 205, 224, 240, 256, 272, 288, 304, 320, 336, 352, 368, 384, 408, 432, 456, 480, 504, 528, 552, 576, 608, 640, 672, 704, 736, 768, 808, 848, 888, 928, 984, 1032, 1064, 1128, 1160, 1192, 1224, 1256, 1288, 1320, 1352, 1416, 1480, 1544, 1608, 1672. 1736, 1800, 1864, 1928, 2024. 2088, 2152, 2216, 2280, 2408, 2472, 2536, 2600, 2664, 2728, 2792, 2856, 2976, 3104, 3240, 3368, 3496, 3624, 3753, and 3824. In other words, the prescribed table may include a set of integer values within the range of not exceeding the prescribed value.

For example, in procedure 3b, the candidate value for the TBS whose value is closest to $N^{a}_{info}$ within the range of not falling below $N^{a}_{info}$, may be determined from the prescribed table.

In procedure 3c, $N^{a}_{info}$ is given based on $N^{a}_{info}$=max (3840, 2^n·round(($N_{info}$−24)/2^n)). In procedure 3c, n is given based on n=floor(log2($N_{info}$−24))−5.

For example, after procedure 3c is performed, procedure 3d may be performed.

In procedure 3d, $N_{TBS}$ is determined. $N_{TBS}$ is the TBS. For example, in a case that R is equal to or smaller than ¼, $N_{TBS}$ is given based on $N_{TBS}$=8·C·ceil(($N^{a}_{info}$+24)/(8·C))−24. Here, C is given based on C=ceil(($N^{a}_{info}$+24)/3816).

In procedure 3d, for example, in a case that R exceeds ¼, and $N^{a}_{info}$ exceeds 8424, $N_{TBS}$ is given based on $N_{TBS}$=8·C·ceil($N^{a}_{info}$+24)/(8·C))−24. Here. C is given based on C=ceil(($N^{a}_{info}$+24)/8424).

In procedure 3d, for example, in a case that R exceeds ¼, and $N^{a}_{info}$ is equal to or smaller than 8424, $N_{TBS}$ is given based on $N_{TBS}$=8·ceil(($N^{a}_{info}$+24)/8)−24.

In the first determination method for the TBS, determination of the TBS based at least on L corresponds to determination of the TBS based at least on the amount of resources of the PUSCH per slot. In other words, in the first determination method for the TBS, the TBS is determined regardless of the number of repetitions of the PUSCH, and thus as the number of repetitions is larger, the effective coding rate of the PUSCH can be further reduced. At the same time, reduction of the effective coding rate also brings up a problem that data communication services having large capacity cannot be supported.

One conceivable method for realizing improvement of transmission efficiency while maintaining support of the data communication services having large capacity is scaling of the transport block. Scaling of the transport block may be a method of determining the TBS that corresponds to the actual amount of resources of the PUSCH (for example, the amount of resources that takes the number of repetitions and the like into consideration) and the target coding rate R.

In other words, as the determination methods for the TBS, the baseband unit 13 may include the first determination method and a second determination method. Here, the second determination method for the TBS may be a determination method in which scaling of the transport block is performed. The first determination method for the TBS may be a determination method in which scaling of the transport block is not performed.

Figure 10:
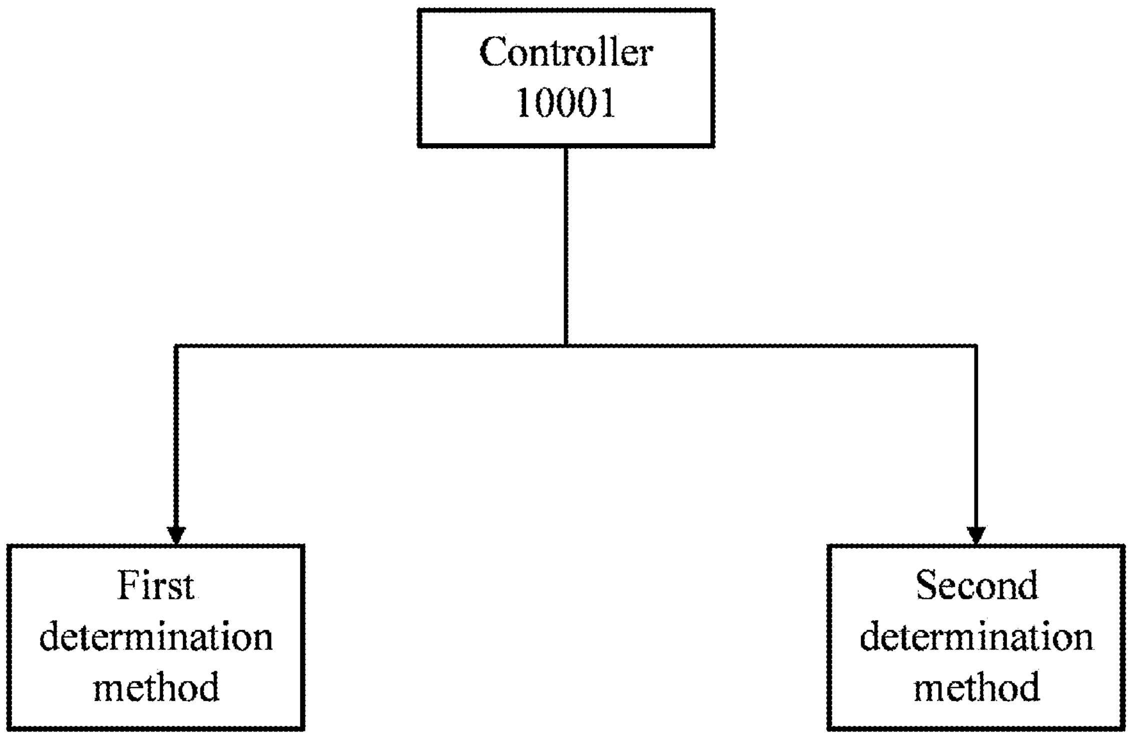
FIG. 10 is a diagram illustrating an example of selection of determination methods for a TBS according to an aspect of the present embodiment.

FIG. 10 is a diagram illustrating an example of selection of the determination methods for the TBS according to an aspect of the present embodiment. In FIG. 10, a controller 10001 includes a function of selecting either of the first determination method or the second determination method. For example, the determination method for the TBS may be selected based at least on an RRC parameter. For example, in a case that an RRC parameter indicating that scaling of the transport block is configured for the PUSCH is provided for the terminal apparatus 1, the second determination method may be used. In a case that the RRC parameter is not provided for the terminal apparatus 1, the first determination method may be used.

For example, the determination method for the TBS may be selected based at least on a value of a field included in the DCI format. For example, in a case that application of scaling of the transport block to the PUSCH is indicated by a value of a certain field included in the DCI format used for scheduling of the PUSCH, the second determination method may be used. In a case that application of scaling of the transport block to the PUSCH is not indicated by the value of the field, the first determination method may be used. Here, the value of the field included in the DCI format includes a value of an RNTI used for scrambling of a CRC sequence included in the DCI format. In other words, in a case that the CRC sequence used for scrambling of the CRC sequence added to the DCI format used for scheduling of the PUSCH is scrambled with a first RNTI, the second determination method may be used. In a case that the CRC sequence is scrambled with a second RNTI different from the first RNTI, the first determination method may be used. For example, the first RNTI may be the C-RNTI. For example, the second RNTI may be the TC-RNTI.

For example, the determination method for the TBS may be selected based at least on a method of scheduling of the PUSCH. For example, in a case that the PUSCH is scheduled using the DCI format, the first determination method may be used. In a case that the PUSCH is scheduled using the random access response grant, the second determination method may be used.

For example, the determination may be made based at least on a part or all of the RRC parameter, the value of the field included in the DCI format used for scheduling of the PUSCH, and the method of scheduling of the PUSCH.

For example, in a case that the PUSCH is scheduled using the DCI format, and a value of a certain field included in the DCI format indicates a first value, the second determination method may be used. In a case that the PUSCH is scheduled using the DCI format, and a value of a certain field included in the DCI format indicates a second value different from the first value, the first determination method may be used. In a case that the PUSCH is scheduled using the random access response grant, the first determination method may be used. For example, the first value may be the C-RNTI. The second value may be the TC-RNTI.

For example, in a case that a value of the time domain resource assignment field included in the DCI format used for scheduling of the PUSCH indicates first time domain resource assignment information, the second determination method may be used. In a case that the value of the time domain resource assignment field included in the DCI format used for scheduling of the PUSCH indicates second time domain resource assignment information different from the first time domain resource assignment information, the first determination method may be used. For example, a set of pieces of information at least including the first time domain resource assignment information and the second time domain resource assignment information may be provided by an RRC parameter. Each piece of time domain resource assignment information included in the set of pieces of information may at least include at least the range of time domain resource assignment. Each piece of time domain resource assignment information included in the set of pieces of information may at least include information indicating that scaling of the transport block is to be applied to the PUSCH. In other words, for example, the first time domain resource assignment information may at least include the information indicating that scaling of the transport block is to be applied to the PUSCH. The second time domain resource assignment information need not include the information indicating that scaling of the transport block is to be applied to the PUSCH.

For example, the second determination method for the TBS may be a method of setting $N^{sh}_{symb}$ equal to a value that is different from information L of indicating the range of time domain resource assignment in procedure 1a of the first determination method. For example, $N^{sh}_{symb}$ may be a value that takes the number of repetitions of the PUSCH into consideration. $N^{sh}_{symb}$ may be determined based at least on the sum of OFDM symbols included in multiple PUSCHs mapped to one or multiple slots. $N^{sh}_{symb}$ may be determined based at least on a value obtained by multiplying L by the number of repetitions of the PUSCH.

For example, the second determination method for the TBS is a method of using a coefficient β used to multiply $N^{sh}_{symb}$ in procedure 1a of the first determination method. For example, the second determination method for the TBS in the first repetition type of the PUSCH may be a determination method in which procedure 1a of the first determination method is changed to the following procedure. Here, the coefficient β may be a value different from 1.

Procedure 1a) determine $N^{a}_{RE}=N^{RB}_{sc}\cdot N^{sh}_{symb}\cdot\beta-N^{PRB}_{DMRS}-NN^{PRB}_{oh}$.

For example, β may be a value larger than 1. β may be a value smaller than 1. β may be determined based at least on the number of repetitions of the PUSCH. β may be provided based at least on an RRC parameter. β may be determined based at least on the DCI format used for scheduling of the PUSCH.

For example, the second determination method for the TBS is a method of using a coefficient γ used to multiply $n_{PRB}$ in procedure 1b of the first determination method. For example, the second determination method for the TBS in the first repetition type of the PUSCH may be a determination method in which procedure 1b of the first determination method is changed to the following procedure. Here, the coefficient γ may be a value different from 1.

Procedure 1b) determine $N_{RE}=\min(X1, N^{a}_{RE})\cdot n_{PRB}\cdot\gamma$.

For example, γ may be a value larger than 1. γ may be a value smaller than 1. γ may be determined based at least on the number of repetitions of the PUSCH. γ may be provided based at least on an RRC parameter. γ may be determined based at least on the DCI format used for scheduling of the PUSCH.

For example, X1 used in the second determination method for the TBS may be a value different from X1 used in the first determination method. For example, in procedure 1a, in a case that the value of $N^{sh}_{symb}$ is scaled by 3, X1 used in the second determination method may also be a value adjusted according to β. For example, in a case that β=2 is used in the second determination method, X1 may be a doubled value of 156. The value adjusted according to β may be provided by an RRC parameter.

For example, the second determination method for the TBS is a method of using 6 used to multiply $N^{a}_{RE}$ in procedure 1b of the first determination method. For example, the second determination method for the TBS in the first repetition type of the PUSCH may be a determination method in which procedure 1b of the first determination method is changed to the following procedure.

Procedure 1b) determine $N_{RE}=\min(X2, N^{a}_{RE}\cdot\delta)\cdot n_{PRB}$.

For example, δ may be a value larger than 1. δ may be a value smaller than 1. δ may be determined based at least on the number of repetitions of the PUSCH. δ may be provided based at least on an RRC parameter. δ may be determined based at least on the DCI format used for scheduling of the PUSCH.

For example, X2 may be a value different from X1. For example, in procedure 1b, in a case that the value of $N^{a}_{RE}$ is scaled by δ, X1 used in the second determination method may also be a value adjusted according to δ. For example, in a case that δ=2 is used in the second. determination method, X1 may be a doubled value of 156. The value adjusted according to δ may be provided by an RRC parameter.

For example, the second determination method for the TBS is a method of using a coefficient ε used to multiply $N_{RE}\cdot R\cdot Q_m\cdot v$ in procedure 2 of the first determination method. For example, the second determination method for the TBS in the first repetition type of the PUSCH may be a method in which procedure 2 of the first determination method is changed to the following procedure. Here, the coefficient ε may be a value different from 1.

Procedure 2) determine the intermediate value of information bits $N_{info}=N_{RE}\cdot R\cdot Q_m\cdot v\cdot\varepsilon$.

For example, ε may be a value larger than 1. ε may be a value smaller than 1. ε may be determined based at least on the number of repetitions of the PUSCH. ε may be provided based at least on an RRC parameter. ε may be determined based at least on the DCI format used for scheduling of the PUSCH.

For example, the second determination method for the TBS is a method of using a value different of the target coding rate R used in the first determination method, For example, the target coding rate R may be different based at least on whether the determination method for the TBS of the transport block included in the PUSCH is the first determination method or the second determination method. For example, in a case that the value of the MCS field included in the DCI format used for scheduling of the PUSCH is set equal to a prescribed value, and the determination method for the TBS of the transport block included in the PUSCH is the first determination method, a first target coding rate R may be used for the first determination method. In a case that the value of the MCS field included in the DCI format used for scheduling of the PUSCH is set equal to the prescribed value, and the determination method for the TBS of the transport block included in the PUSCH is the second determination method, a second target coding rate R different from the first target coding rate may be used for the second determination method.

In other words, the second determination method for the TBS may be a determination method in which scaling is applied to the TBS determined with the first determination method.

Figure 11:
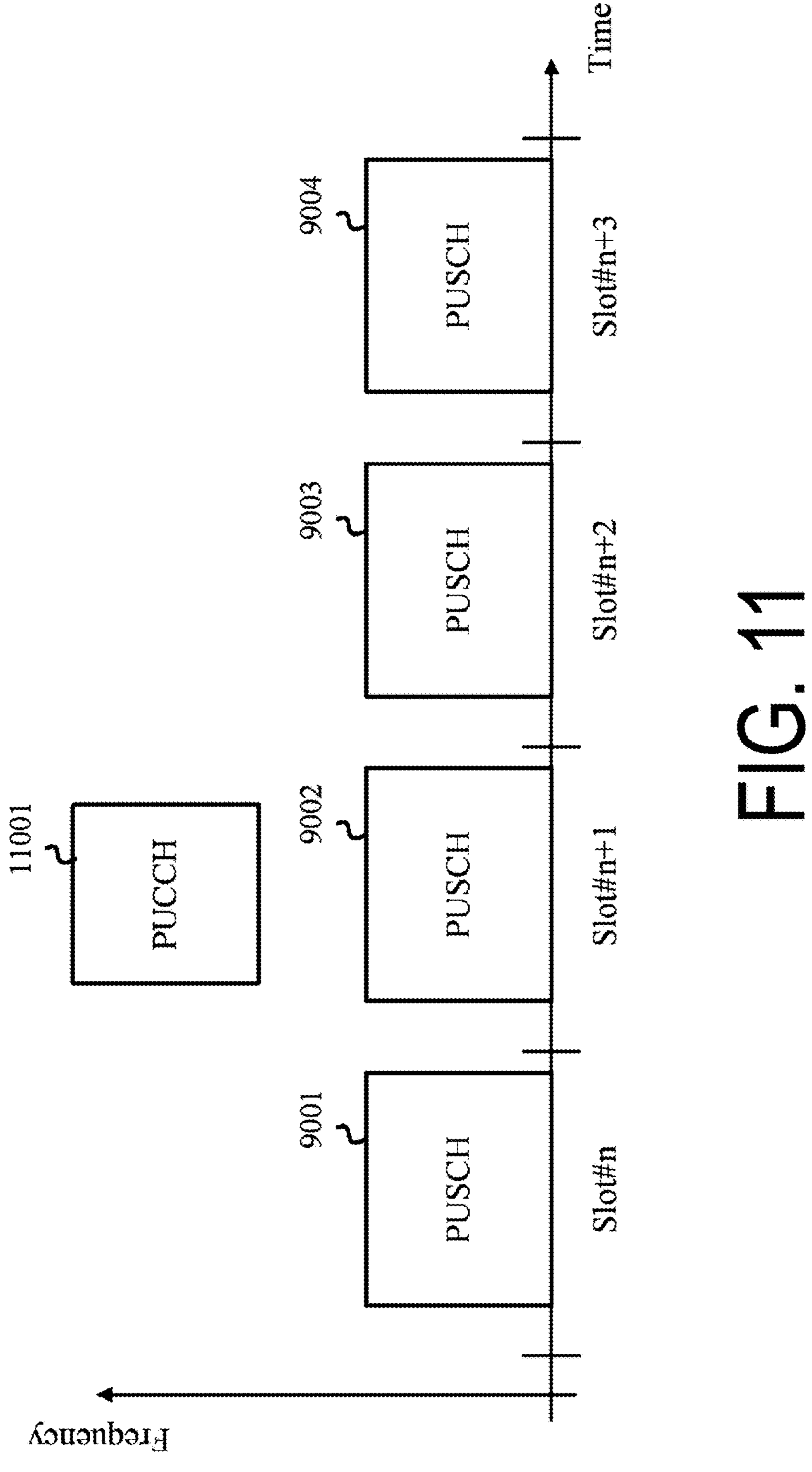
FIG. 11 is a diagram illustrating an example related to collision between a PUCCH and a PUSCH according to an aspect of the present embodiment.

FIG. 11 is a diagram illustrating an example related to collision between the PUCCH and the PUSCH according to an aspect of the present embodiment. In FIG. 11, the horizontal axis indicates the time axis, and the vertical axis indicates the frequency axis. The PUSCH 9002 and a PUCCH 11001 share the same time domain resources. Note that the configuration of the PUSCH and the configuration of the slots are the same as those of FIG. 9.

Here, a case that a certain channel and another channel share the same time domain resources means that a part of the time domain resources of the certain channel are the same time domain resources as a part of the time domain resources of the other channel. For example, a case that a certain channel and another channel share the same resources may mean that all of the time domain resources of the certain channel are the same time domain resources as all of the time domain resources of the other channel. A case that a certain channel and another channel share the same resources may mean that all of the time domain resources of the certain channel are the same time domain resources as a part of the time domain resources of the other channel. A case that a certain channel and another channel share the same resources may mean that a part of the time domain resources of the certain channel are the same time domain resources as all of the time domain resources of the other channel. A case that a certain channel and another channel share the same resources may mean that a part of the time domain resources of the certain channel are the same time domain resources as all of the time domain resources of the other channel.

As illustrated in FIG. 11, in a case that the PUSCH 9002 and the PUCCH 11001 share the same time domain resources, a part or all of UCI configured to be transmitted on the PUCCH 11001 may be piggybacked on the PUSCH 9002. The case that the UCI is piggybacked on the PUSCH 9002 may mean that the UCI is multiplexed on the transport block included in the PUSCH 9002. Here, in a case that the PUSCH 9002 is transmission including only aperiodic CSI, the UCI may be multiplexed on the aperiodic CSI. The piggyback of the UCI may be performed by the coder 12000 of the terminal apparatus 1.

Figure 12:
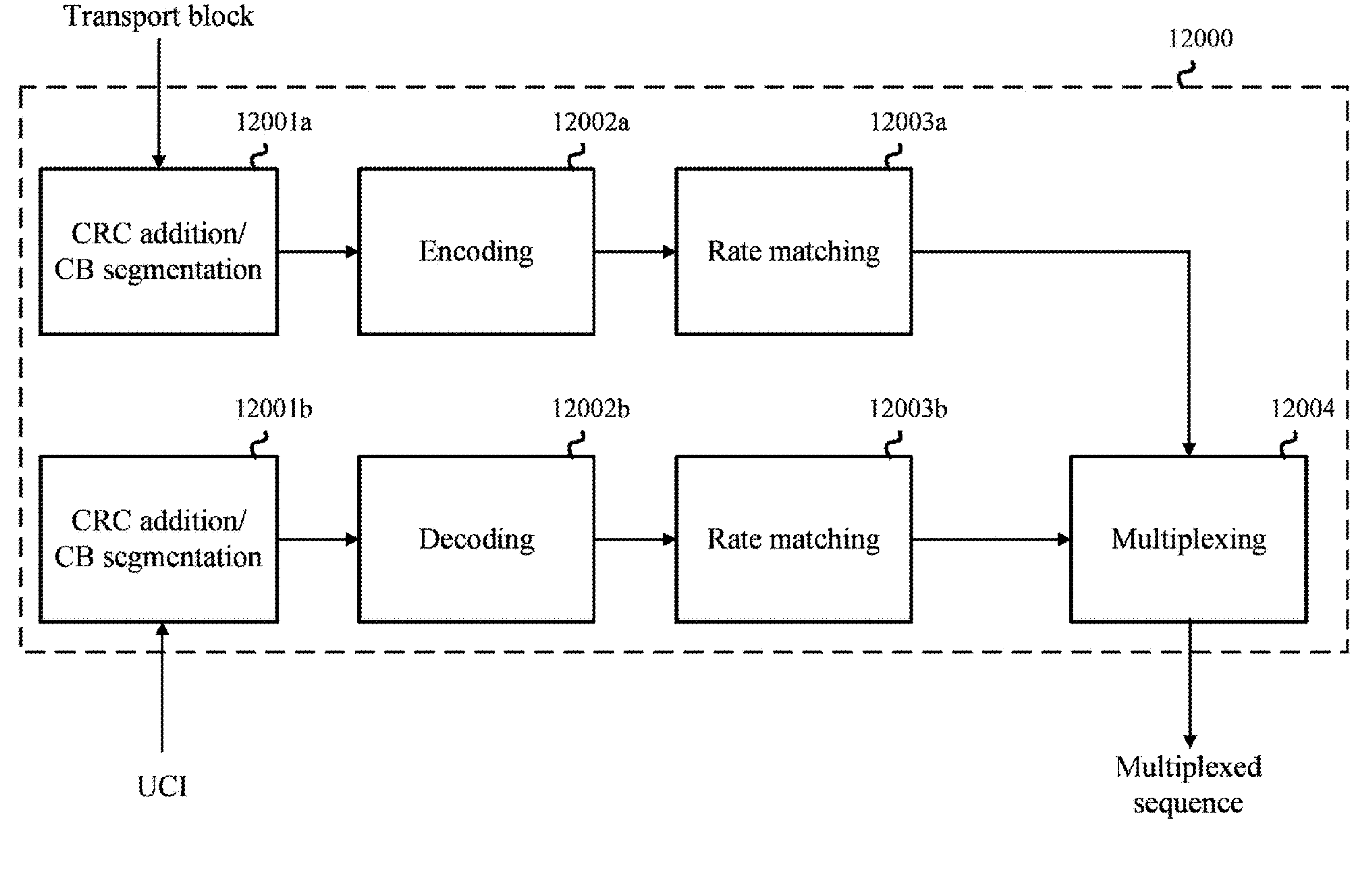
FIG. 12 is a diagram illustrating a configuration example of a coder 12000 according to an aspect of the present embodiment.

FIG. 12 is a diagram illustrating a configuration example of the coder 12000 according to an aspect of the present embodiment. The coder 12000 at least includes a part or all of a CRC addition/code block segmentation unit 12001*a*, a CRC addition/code block segmentation unit 12001*b*, a coder 12002*a*, a coder 12002*b*, a rate matching unit 12003*a*, a rate matching unit 12003*b*, and a multiplexing unit 12004.

As illustrated in FIG. 12, a transport block is input to the CRC addition/code block segmentation unit 12001*a*. In the CRC addition/code block segmentation unit 12001*a*, a CRC sequence to be added to the transport block is determined based at least on the TBS of the transport block. Based at least on the TBS, whether code block segmentation is performed on the transport block may be determined. In a case that code block segmentation is not performed on the transport block, it may be considered that the transport block to which the CRC sequence is added is one code block.

One or multiple code blocks determined in the CRC addition/code block segmentation unit 12001*a* are input to the coder 12002*a*. The coder 12002*a* may apply an error correction code to each of the one or multiple code blocks, with each code block being a unit of coding.

The one or multiple code blocks to which the error correction code is applied are input to the rate matching unit 12003*a*. The rate matching unit 12003*a* determines a sequence to be mapped to the PUSCH.

The rate matching output sequence determined in the rate matching unit 12003*a* is input to the multiplexing unit 12004. Here, in a case that code block segmentation is performed on the transport block in the CRC addition/code block segmentation unit 12001*a*, a sequence input to the multiplexing unit 12004 may be a sequence given by concatenating the multiple rate matching output sequences.

As illustrated in FIG. 12, UCI is input to the CRC addition/code block segmentation unit 12001*b*. In the CRC addition/code block segmentation unit 12001*b*, a CRC sequence to be added to the transport block is determined based at least on the size of the UCI. Based at least on the size of the UCI, whether code block segmentation is performed on the UCI may be determined. In a case that code block segmentation is not performed on the UCI, it may be considered that the UCI to which the CRC sequence is added is one code block, One or multiple code blocks determined in the CRC addition/code block segmentation unit 12001 b are input to the coder 12002*b*. The coder 12002*b* may apply an error correction code to each of the one or multiple code blocks, with each code block being a unit of coding.

The one or multiple code blocks to which the error correction code is applied are input to the rate matching unit 12003*b*. The rate matching unit 12003*b* determines a sequence to be mapped to the PUSCH.

The rate matching output sequence determined in the rate matching unit 12003*b* is input to the multiplexing unit 12004. Here, in a case that code block segmentation is performed on the transport block in the CRC addition/code block segmentation unit 12001*b*, a sequence input to the multiplexing unit 12004 may be a sequence given by concatenating the multiple rate matching output sequences.

The multiplexing unit 12004 multiplexes the rate matching output sequence for the transport block and the rate matching output sequence for the UCI, using a prescribed interleaver. The multiplexed sequence is mapped to the PUSCH.

In the following, a determination method for the rate matching output sequence for the UCI in the rate matching unit 12003*b* will be described.

Determination of the rate matching output sequence for the is determined based at least on a rate matching output sequence length of the rate matching output sequence. For example, a rate matching output sequence length E may be given based on E=floor($E_{UCI}/C_{UCI}$). Here, $E_{UCI}$ is determined based on $E_{UCI}=N_L \cdot Q^a \cdot Q_m$. Here, $N_L$ indicates the number of layers of the PUSCH. $Q_m$ indicates modulation order of a modulation scheme of the PUSCH.

In the first repetition type of the PUSCH, $Q^a$ in the determination of the rate matching output sequence length may be determined using first calculation or second calculation.

The first calculation may be calculation based at least on one or both of a value $ELE_{1a}$ and a value $ELE_{1b}$. For example, the first calculation may be a method of selecting a minimum value out of the value $ELE_{1a}$ and the value $ELE_{1b}$. For example, the first calculation may be $Q_a$=min ($ELE_{1a}$, $ELE_{1b}$).

The value $ELE_{1a}$ may be determined based at least on a part or all of a size $O_{UCI}$ of UCI, a value $L_{UCI}$ related to the size of the CRC added to the UCI, $\beta_{offset}$, a value $N_{symb,\ 1a}$ related to the time domain resources of the PUSCH, a value $M_{sc}$ related to the frequency domain resources assigned to the PUSCH, and $K_r$. For example, the value $ELE_{1a}$ may be determined based at least on the following Expression 1.

$$ELE_{1a} = \text{ceil}((O_{UCI} + L_{UCI}) \cdot \beta_{offset} \cdot R) \quad \text{[Expression 1]}$$

R of Expression 1 may be determined based at least on the following Expression 2.

$$R = \frac{\sum_{l=0}^{N_{symb,1a}-1} M_{sc}(l)}{\sum_{r=0}^{C-1} K_r} \quad \text{[Expression 2]}$$

For example, $L_{UCI}$ may be equal to the size of the CRC added to the UCI.

For example, $\beta_{offset}$ may be provided by an RRC parameter.

For example, $N_{symb,\ 1a}$ may indicate the number of OFDM symbols of the PUSCH on which the UCI is multiplexed. $N_{symb,\ 1a}$ may indicate the number of OFDM symbols obtained by subtracting at least the OFDM symbols used for the reference signal related to the PUSCH from the OFDM symbols of the PUSCH on which the UCI is multiplexed.

For example, $M_{sc}$(l) may indicate the number of resource elements of the PUSCH included in a first OFDM symbol of the PUSCH on which the UCI is multiplexed. Here, $M_{sc}$(l) may be a number obtained by subtracting at least the resource elements used for the VMS related to the PUSCH.

For example, $K_r$ may indicate the size of an r-th code block out of the UCI segmented into C code blocks.

The value $ELE_{1b}$ may be determined based at least on a part or all of α, $l_0$, a value $N_{symb,\ 1b}$ related to the time domain resources of the PUSCH, and a value $M_{sc}$ related to the frequency domain resources assigned to the PUSCH. For example, the value $ELE_{1b}$ may be determined based at least on the following Expression 3.

$$ELE_{1b} = \alpha \cdot \sum_{l=l_0}^{N_{symb,1b}-1} M_{sc}(l) \quad \text{[Expression 3]}$$

For example, a may be provided by an RRC parameter.

For example, $l_0$ may indicate the index of a first OFDM symbol that can be used for multiplexing of the UCI out of the OFDM symbols of the PUSCH on which the UCI is multiplexed.

For example, $N_{symb,\ 1b}$ may indicate the number of OFDM symbols of the PUSCH on which the UCI is multiplexed. $N_{symb,\ 1b}$ may indicate the number of OFDM symbols obtained by subtracting at least the OFDM symbols used for the reference signal related to the PUSCH from the OFDM symbols of the PUSCH on which the UCI is multiplexed.

In a case that the second determination method is used as the determination method for the TBS, in the first repetition type of the PUSCH, $Q^a$ in the determination of the rate matching output sequence length may be determined using the second calculation.

For example, in the second calculation, at least one of the parameters used in the first calculation may be replaced with a parameter different from the parameter.

1) $\beta_{offset}$
2) R
3) $N_{symb,\ 1a}$
4) $K_r$
5) $N_{symb,\ 1b}$
6) α

For example, in the second calculation, $\beta_{offset}$ used in the first calculation may be replaced with $\beta_{offset,\ 2}$. Here, $\beta_{offset,\ 2}$ may be provided by an RRC parameter different from the RRC parameter for providing $\beta_{offset}$.

For example, in the second calculation, R used in the first calculation may be the target coding rate indicated by the value of the MCS field indicated by the DCI format used for scheduling of the PUSCH 9002.

For example, in the second calculation, $N_{symb,\ 1a}$ may be replaced with $N_{symb,\ 2a}$. Here, $N_{symb,\ 2a}$ may indicate the number of OFDM symbols included in all of the repetitions of the PUSCH including the PUSCH 9002. For example, $N_{symb,\ 2a}$ may indicate the number of OFDM symbols included in the PUSCH 9001 to the PUSCH 9004.

For example, in the second calculation, $K_r$ may be replaced with $K_{r,\ 2}$. Here, $K_{r,\ 2}$ may be the size of the r-th code block calculated based on an assumption that the TBS is determined using the first determination method, regardless of whether the determination method for the TBS used for the PUSCH 9002 is the first determination method or the second determination method.

For example, in the second calculation, $N_{symb,\ 1b}$, may be replaced with $N_{symb,\ 2b}$. Here, $N_{symb,\ 2b}$ may be determined based at least on the OFDM symbols included in all of the repetitions of the PUSCH including the PUSCH 9002. For example, $N_{symb,\ 2b}$ may indicate the value obtained by subtracting at least the number of OFDM symbols used for the reference signal related to the PUSCH from the OFDM symbols included in the PUSCH 9001 to the PUSCH 9004.

For example, in the second calculation, a may be replaced with $\alpha_2$. Here, $\alpha_2$ may be provided by an RRC parameter different from the RRC parameter for providing α.

For example, in the first repetition type of the PUSCH, the calculation method for $Q^a$ may be determined based at least on the determination method for the TBS of the PUSCH. For example, in the first repetition type of the PUSCH, in a case that the determination method for the TBS of the PUSCH is the first determination method, the first calculation may be used for determination of $Q^a$. In the first repetition type of the PUSCH, in a case that the determination method for the TBS of the PUSCH is the second determination method, the second calculation may be used for determination of $Q^a$.

For example, in the first repetition type of the PUSCH, the calculation method for $Q^a$ may be determined based at least on a part or all of an RRC parameter, a value of a field included in the DCI format used for scheduling of the PUSCH, and a method of scheduling of the PUSCH.

For example, in a case that the PUSCH is scheduled using the DCI format, and a value of a certain field included in the DCI format indicates a first value, the second calculation may be used for determination of $Q^a$. In a case that the PUSCH is scheduled using the DCI format, and the value of the certain field included in the DCI format indicates a second value different from the first value, the first calculation may be used for determination of $Q^a$. In a case that the PUSCH is scheduled using the random access response grant, the first calculation may be used for determination of $Q^a$. For example, the first value may be the C-RNTI. The second value may be the TC-RNTI.

For example, in a case that a value of the time domain resource assignment field included in the DCI format used for scheduling of the PUSCH indicates first time domain resource assignment information, the second calculation may be used for determination of $Q^a$. In a case that the value of the time domain resource assignment field included in the DCI format used for scheduling of the PUSCH indicates second time domain resource assignment information different from the first time domain resource assignment information, the first calculation may be used for determination of $Q^a$. For example, a set of pieces of information at least including the first time domain resource assignment information and the second time domain resource assignment information may be provided by an RRC parameter. Each piece of time domain resource assignment information included in the set of pieces of information may at least include at least the range of time domain resource assignment. Each piece of time domain resource assignment information included in the set of pieces of information may at least include a parameter indicating the calculation method for $Q^a$.

Figure 13:
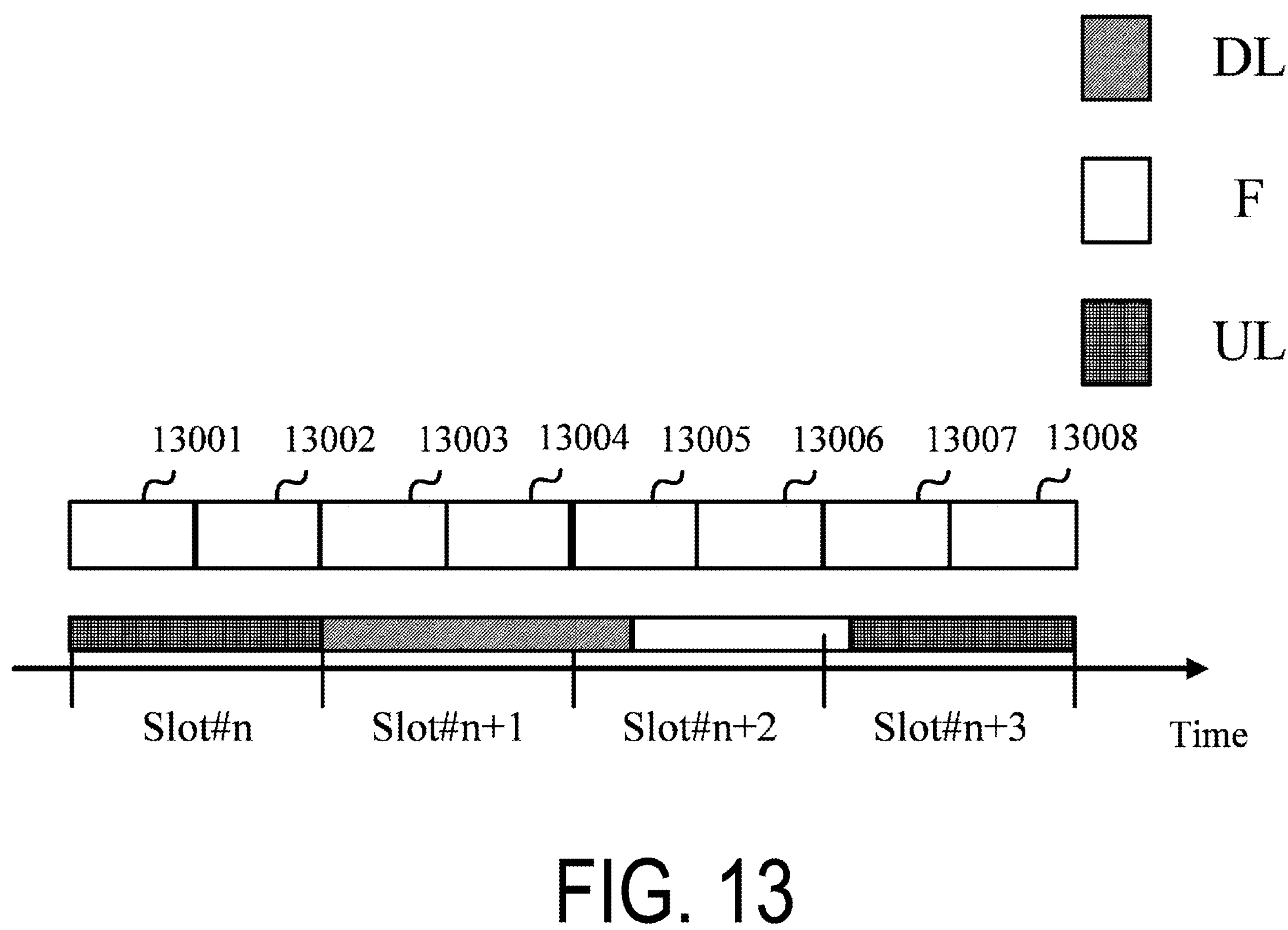
FIG. 13 is a diagram illustrating an example of a second repetition type of PUSCH according to an aspect of the present embodiment.

FIG. 13 is a diagram illustrating an example of the second repetition type of PUSCH according to an aspect of the present embodiment. In FIG. 13, the horizontal axis indicates the time domain. A grid line of the horizontal axis indicates a boundary between slots. A slot at the left end in FIG. 9 is slot #n, and slot indexes are assigned in ascending order in the time domain, The time domain corresponding to a block hatched with diagonal lines indicates that the time domain is a downlink. The time domain corresponding to a white block indicates that the time domain is a flexible domain. The time domain corresponding to a block hatched with grid lines indicates that the time domain is an uplink.

13001 to 13008 indicate nominal repetitions of the PUSCH. In the example of FIG. 13, nominal repetitions configured for seven OFDM symbols are repeated eight times. In the second repetition type of the PUSCH, actual repetitions are determined based at least on the nominal repetitions and a TDD pattern configuration. The determined actual reptitions are transmitted by the terminal apparatus 1. Here, the TDD pattern configuration is a configuration on the time domain configured based at least on a part or all of the downlink, the flexible domain, and the uplink.

Figure 14:
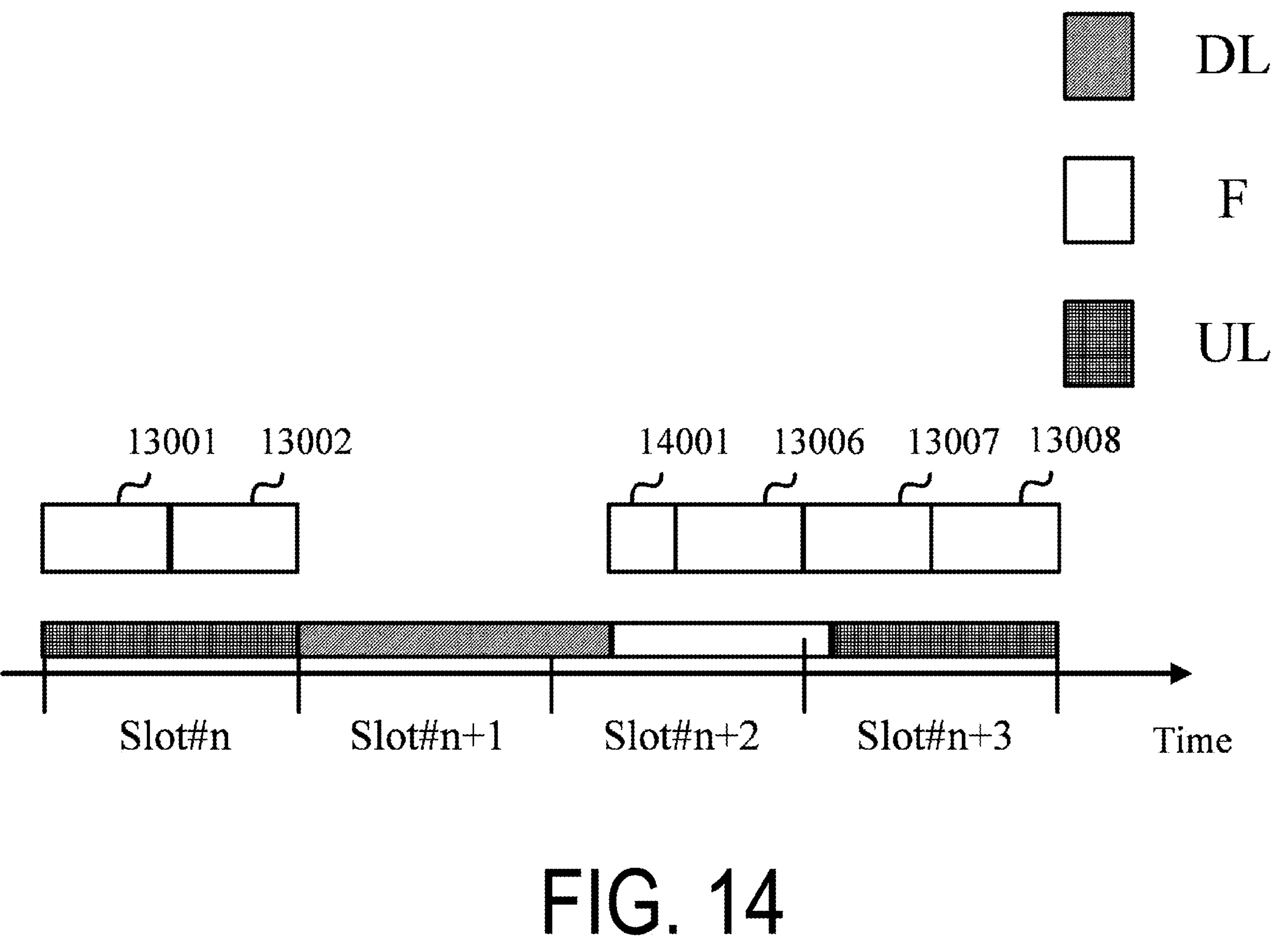
FIG. 14 is a diagram illustrating an example of a generation method of actual repetitions according to an aspect of the present embodiment.

FIG. 14 is a diagram illustrating an example of a generation method of the actual repetitions according to an aspect of the present embodiment. In FIG. 14, nominal repetitions 13001, 13002, and 13008 are configured in the uplink domain. In this manner, the nominal repetitions configured in the uplink domain are configured for the actual repetitions without changing the time domain resources. In other words, the nominal repetitions 13001, 13002, and 13008 are also referred to as actual repetitions 13001, 13002, and 13008, respectively.

In FIG. 14, the actual repetitions based on nominal repetitions 13003 and 13004 configured in the downlink domain are not generated. In other words, in a case that the nominal repetitions are configured in the downlink domain, the actual repetitions based on the nominal repetitions are not generated.

In FIG. 14, a nominal repetition 13006 is configured in the flexible domain, in this manner, the nominal repetitions configured in the flexible domain are configured for the actual repetitions without changing the time domain resources. In other words, the nominal repetition 13006 is also referred to as an actual repetition 13006.

In FIG. 14, a nominal repetition 13007 is configured over the uplink domain and the flexible domain. In this manner, the nominal repetition configured over the uplink domain and the flexible domain is configured for the actual repetition without changing the time domain resources. In other words, the nominal repetition 13007 is also referred to as an actual repetition 13007.

In FIG. 14, an actual repetition 14001 based on a nominal repetition 13005 is generated. Here, the nominal repetition 13005 is configured over the downlink domain and the flexible domain. The actual repetition 14001 constitutes time domain resources not including the time domain resources configured in the downlink domain, out of the time domain resources of the nominal repetition 13005.

For example, the range of time domain resource assignment of the nominal repetition 13001 of the PUSCH may be provided by the time domain resource assignment field included in the DCI format used for scheduling of the PUSCH. The range of time domain resource assignment may be provided by an RRC parameter. For example, the range of time domain resource assignment of the nominal repetition 13002 may be started from an OFDM symbol next to the OFDM symbol at the end of the nominal repetition 13001. The range of time domain resource assignment for a nominal repetition 1300X may be started from an OFDM symbol next to the OFDM symbol at the end of a nominal repetition 1300X-1.

In the second repetition type of the PUSCH, the number of repetitions may be provided, in addition to the range of time domain resource assignment. For example, information indicating the number of repetitions may be provided by a field included in the DCI format used for scheduling of the PUSCH. The information indicating the number of repetitions may be provided by an RRC parameter.

For example, in a case that the range of time domain resource assignment indicates information of {S, L}, the time domain resources of L OFDM symbols may be assigned from OFDM symbol #S to the nominal repetition 13001. In the example of FIG. 13, an example of S=0 and L=7 is illustrated. Here, S indicates an index of a first OFDM symbol for a first nominal repetition of the PUSCH. L indicates the number of OFDM symbols of the nominal repetition of the PUSCH.

In the second repetition type of the PUSCH, the TBS of the transport block included in the PUSCH is determined using the first determination method.

For example, the determination method for the TBS may be determined depending on the repetition type of the PUSCH. For example, the determination method for the TBS may be the first determination method for the first repetition type of the PUSCH, and the determination method for the TBS may be the second determination method for the second repetition type of the PUSCH. The determination method for the TBS may be the first determination method for the second repetition type of the PUSCH, and the determination method for the TBS may be the second determination method for the first repetition type of the PUSCH. For example, an RRC parameter indicating the determination method for the TBS may be provided for each repetition type of the PUSCH.

Figure 15:
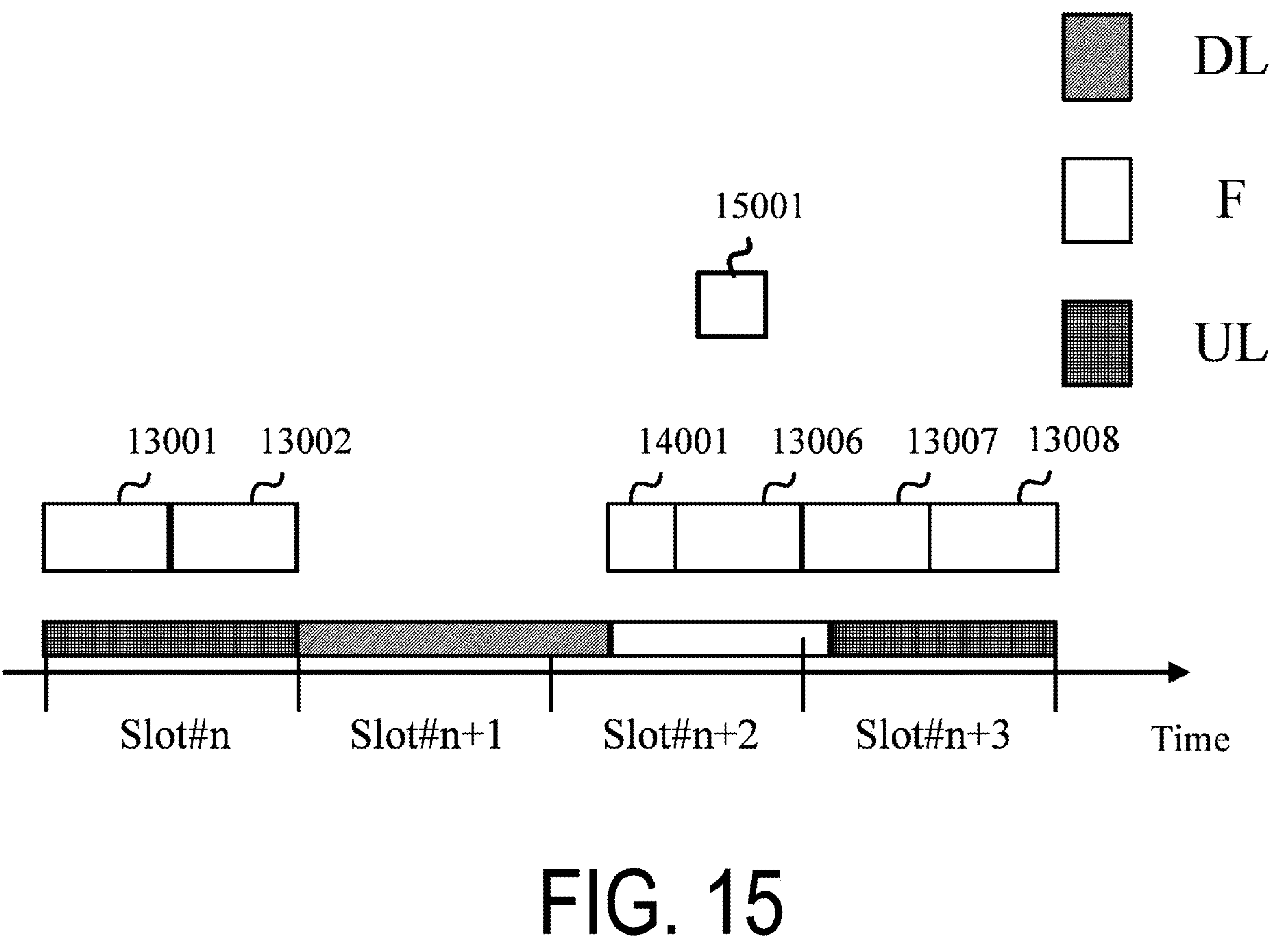
FIG. 15 is a diagram illustrating an example related to collision between a PUCCH and a PUSCH according to an aspect of the present embodiment.

FIG. 15 is a diagram illustrating an example related to collision between the PUCCH and the PUSCH according to an aspect of the present embodiment. In FIG. 15, the horizontal axis indicates the time axis, and the vertical axis indicates the frequency axis. The actual repetition 13006 of the PUSCH and a PUCCH 15001 share the same time domain resources. Note that the configuration of the PUSCH and the configuration of the slots are the same as those of FIG. 9.

As illustrated in FIG. 15, in a case that the actual repetition 13006 of the PUSCH and the PUCCH 15001 share the same time domain resources, a part or all of UCI configured to be transmitted on the PUCCH 15001 may be piggybacked on the actual repetition 13006 of the PUSCH.

In the second repetition type of the PUSCH, $Q^a$ in the determination of the rate matching output sequence length may be determined using third calculation or fourth calculation.

The third calculation may be calculation based at least on a part or all of a value $ELE_{1a}$, a value $ELE_{1b}$, and a value $ELE_{3c}$. For example, the third calculation may be a method of selecting a minimum value out of the value $ELE_{1a}$, the value $ELE_{1b}$, and the value $ELE_{3c}$. For example, the third calculation may be $Q_a=\min(ELE_{1a}, ELE_{1b}, ELE_{3c})$.

For example, in the third calculation, $N_{symb,\ 1a}$ is may indicate the number of OFDM symbols corresponding to the nominal repetition of the PUSCH. $N_{symb,\ 1a}$ in may indicate the number of OFDM symbols obtained by subtracting at least the number of OFDM symbols of the DMRS corresponding to the number of the OFDM symbols corresponding to the nominal repetition from the OFDM symbols corresponding to the nominal repetition of the PUSCH.

For example, in the third calculation, $M_{sc}(l)$ may indicate the number of resource elements corresponding to the nominal repetition of the PUSCH, Here, $M_{sc}(l)$ may be a number obtained by subtracting at least the resource elements of the PTRS corresponding to the nominal repetition of the PUSCH.

For example, in the second repetition type of the PUSCH, $l_0$ may indicate the index of a first OFDM symbol that can be used for multiplexing of the UCI out of the OFDM symbols corresponding to the nominal repetition of the PUSCH. For example, in the second repetition type of the PUSCH, $l_0$ may be 0.

For example, $N_{symb,\ 1b}$ may indicate the number of OFDM symbols corresponding to the nominal repetition of the PUSCH. $N_{symb,\ 1b}$ may indicate the number of OFDM symbols obtained by subtracting at least the number of OFDM symbols of the DMRS corresponding to the number of the OFDM symbols corresponding to the nominal repetition from the OFDM symbols corresponding to the nominal repetition of the PUSCH.

The value $ELE_{3c}$ may be determined based at least on one or both of a number $N_{symb,3c}$ of OFDM symbols included in the actual repetition on which the UCI is multiplexed and a number $M_{sc,\ actual}(l)$ of resource elements included in a first OFDM symbol of the actual repetition. For example, the value $ELE_{3c}$ may be determined based at least on the following Expression 4.

$$ELE_{3c} = \sum_{l=l_0}^{N_{symb,actual}} N_{sc,actual}(l) \quad \text{[Expression 4]}$$

In a case that the second determination method is used as the determination method for the TBS, in the second repetition type of the PUSCH, $Q^a$ in the determination of the rate matching output sequence length may be determined using the fourth calculation.

For example, in the fourth calculation, at least one of the parameters used in the third calculation may be replaced with a parameter different from the parameter.

1) $\beta_{offset}$
2) R
3) $N_{symb,\ 1a}$
4) $K_r$
5) $N_{symb,\ 1b}$
6) $\alpha$ For example, in the fourth calculation, $\beta_{offset}$ used in the third calculation may be replaced with $\beta_{offset,\ 3}$. Here, $\beta_{offset,\ 3}$ may be provided by an RRC parameter different from the RRC parameter for providing $\beta_{offset}$. $\beta_{offset,\ 3}$ may be provided by an RRC parameter different from the RRC parameter for providing $\beta_{offset,\ 2}$.

For example, in the fourth calculation, R used in the third calculation may be the target coding rate indicated by the value of the MCS field indicated by the DCI format used for scheduling of the PUSCH.

For example, in the fourth calculation, $N_{symb,\ 1a}$ may be replaced with $N_{symb,\ 2a}$. Here, $N_{symb,\ 2a}$ may indicate the number of OFDM symbols included in all of the nominal repetitions of the PUSCH. For example, $N_{symb,\ 2a}$ may indicate the number of OFDM symbols included in all of the actual repetitions of the PUSCH.

For example, in the fourth calculation, $K_r$ may be replaced with $K_{r,\ 3}$. Here, $K_{r,\ 3}$ may be the size of the r-th code block calculated based on an assumption that the TBS is determined using the fourth determination method, regardless of whether the determination method for the TBS used for the PUSCH 9002 is the third determination method or the fourth determination method.

For example, in the fourth calculation, $N_{symb,\ 1b}$ may be replaced with $N_{symb,\ 3b}$. Here, $N_{symb,\ 3b}$ may be determined based at least on the OFDM symbols included in all of the nominal repetitions of the PUSCH.

For example, in the fourth calculation, $\alpha$ may be replaced with $\alpha_3$. Here, $\alpha_3$ may be provided by an RRC parameter different from the RRC parameter for providing $\alpha$. $\alpha_3$ may be provided by an RRC parameter different from the RRC parameter for providing $\alpha_2$.

For example, in the second repetition type of the PUSCH, the calculation method for $Q^a$ may be determined based at least on the determination method for the TBS of the PUSCH. For example, in the second repetition type of the PUSCH, in a case that the determination method for the TBS of the PUSCH is the first determination method, the third calculation may be used for determination of $Q^a$. In the second repetition type of the PUSCH, in a case that the determination method for the TBS of the PUSCH is the second determination method, the fourth calculation may be used for determination of $Q^a$.

For example, in the second repetition type of the PUSCH, the calculation method for $Q^a$ may be determined based at least on a part or all of an RRC parameter, a value of a field included in the DCI format used for scheduling of the PUSCH, and a method of scheduling of the PUSCH.

For example, in a case that the PUSCH is scheduled using the DCI format, and a value of a certain field included in the DCI format indicates a first value, the fourth calculation may be used for determination of $Q^a$. In a case that the PUSCH is scheduled using the DCI format, and the value of the certain field included in the DCI format indicates a second value different from the first value, the third calculation may be used for determination of $Q^a$. In a case that the PUSCH is scheduled using the random access response grant, the third calculation may be used for determination of $Q^a$. For example, the first value may be the C-RNTI. The second value may be the TC-RNTI.

For example, in a case that a value of the time domain resource assignment field included in the DCI format used for scheduling of the PUSCH indicates first time domain resource assignment information, the fourth calculation may be used for determination of $Q^a$. In a case that the value of the time domain resource assignment field included in the DCI format used for scheduling of the PUSCH indicates second time domain resource assignment information different from the first time domain resource assignment information, the third calculation may be used for determination of $Q^a$. For example, a set of pieces of information at least including the first time domain resource assignment information and the second time domain resource assignment information may be provided by an RRC parameter. Each piece of time domain resource assignment information included in the set of pieces of information may at least include at least the range of time domain resource assignment. Each piece of time domain resource assignment information included in the set of pieces of information may at least include a parameter indicating the calculation method for $Q^a$.

Various aspects of apparatuses according to an aspect of the present embodiment will be described below.

(1) In order to accomplish the object described above, an aspect of the present invention is contrived to provide the following means. Specifically, a first aspect of the present invention is a terminal apparatus. The terminal apparatus includes a determining unit configured to determine a size of a transport block, based on either of a first determination method or a second determination method, and a transmitter configured to transmit the transport block and uplink control information on a PUSCH. Whether the number of coded modulation symbols of the uplink control information is given by first calculation or given by second calculation is determined based at least on a part or all of whether the first determination method is used for determination of the size, a value of a field included in a DCI format included in scheduling of the PUSCH, and a value of an RRC parameter provided by a higher layer.

(2) A second aspect of the present invention is a base station apparatus. The base station apparatus includes a determining unit configured to determine a size of a transport block, based on either of a first determination method or a second determination method, and a receiver configured to receive the transport block and uplink control information on a PUSCH. Whether the number of coded modulation symbols of the uplink control information is given by first calculation or given by second calculation is determined based at least on a part or all of whether the first determination method is used for determination of the size, a value of a field included in a DCI format included in scheduling of the PUSCH, and a value of an RRC parameter provided by a higher layer.

Each program running on a base station apparatus 3 and a terminal apparatus 1 according to the present invention may be a program that controls a Central Processing Unit (CPU) and the like, such that the program causes a computer to operate in such a manner as to realize the functions of the above-described embodiment according to the present invention. The information handled in these apparatuses is temporarily loaded into a Random Access Memory (RAM) while being processed, is then stored in a Hard Disk Drive (HDD) and various types of Read Only Memory (ROM) such as a Flash ROM, and is read, modified, and written by the CPU, as necessary.

Note that the terminal apparatus 1 and the base station apparatus 3 according to the above-described embodiment may be partially realized by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. A "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically stores a program for a short period of time, such as a communication line in a case that the program is transmitted over a network such as the Internet or over a communication line such as a telephone line, and may also include a medium that stores the program for a fixed period of time, such as a volatile memory included in the computer system functioning as a server or a client in such a case. The above-described program may be one for realizing some of the above-described functions, and also may be one capable of realizing the above-described functions in combination with a program already recorded in a computer system.

Furthermore, the base station apparatus 3 according to the aforementioned embodiment may be realized as an aggregation (apparatus group) including multiple apparatuses. Each of the apparatuses included in such an apparatus group may include each function, or some or all portions of each functional block of the base station apparatus 3 according to the aforementioned embodiment. As the apparatus group, it is only necessary to have a complete set of functions or functional blocks of the base station apparatus 3. Moreover, the terminal apparatus 1 according to the aforementioned embodiment can also communicate with the base station apparatus as the aggregation.

Also, the base station apparatus 3 according to the aforementioned embodiment may be an Evolved Universal Terrestrial Radio Access Network (EUTRAN) and/or a Next-Gen RAN (NG-RAN or NR RAN). Moreover, the base station apparatus 3 according to the aforementioned embodiment may have some or all of the functions of a higher node for an eNodeB and/or a gNB.

Also, some or all portions of each of the terminal apparatus 1 and the base station apparatus 3 according to the aforementioned embodiment may be realized as an LSI which is a typical integrated circuit or may be implemented as a chip set. The functional blocks of each of the terminal apparatus 1 and the base station apparatus 3 may be individually implemented as a chip, or some or all of the functional blocks may be integrated into a chip. Furthermore, a circuit integration technique is not limited to the LSI, and may be realized with a dedicated circuit or a general-purpose processor. Moreover, in a case that a circuit integration technology that substitutes an LSI appears with the advance of the semiconductor technology, it is also possible to use an integrated circuit based on the technology.

In addition, although the aforementioned embodiments have described the terminal apparatus as an example of a communication apparatus, the present invention is not limited to such a terminal apparatus, and is applicable to a terminal apparatus or a communication apparatus that is a stationary type or a non-movable type electronic apparatus installed indoors or outdoors, for example, such as an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. A configuration in which elements described in the respective embodiments and having mutually the similar effects, are substituted for one another is also included.

INDUSTRIAL APPLICABILITY

The present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

1 (1A, 1B, 1C) Terminal apparatus
3 Base station apparatus
10, 30 Radio transmission and/or reception unit
10*a*, 30*a* Radio transmitting unit
10*b*, 30*b* Radio receiving unit
11, 31 Antenna unit
12, 32 RF unit
13, 33 Baseband unit
14, 34 Higher layer processing unit
15, 35 Medium access control layer processing unit
16, 36 radio resource control layer processing unit
91, 92, 93, 94 Search space set
300 Component carrier
301 Primary cell
302, 303 Secondary cell
3000 Point
3001, 3002 Resource grid
3003, 3004 IMP
3011, 3012, 3013, 3014 Offset
3100, 3200 Common resource block set
9001, 9002, 9003, 9004 PUSCH
10001 Controller
11001 PUCCH
12000 Coder
12001*a*, 12001*b* CRC addition/code block segmentation unit
12002*a*, 12002*b* Coder
12003*a*, 12003*b* Rate matching unit
12004 Multiplexing unit
13001 Nominal repetition
14001 Actual repetition
15001 PUCCH

The invention claimed is:

1. A terminal apparatus comprising:

control circuitry configured to select between a first determination method and a second determination method for determining a size of a transport block in a Physical Uplink Shared Channel (PUSCH) based on a value of a time domain resource assignment field included in a Downlink Control Information (DCI) format for scheduling the PUSCH; and transmission circuitry configured to transmit the PUSCH, wherein:

in the first determination method, a number of resource elements (NRE) for determining the size of the transport block is calculated according to a first equation:

NRE=min(156, NaRE)·nPRB, in the second determination method, the NRE for determining the size of the transport block is calculated according to a second equation:

NRE=min(156, NaRE)·nPRB·y, wherein y is provided by a Radio Resource Control (RRC) parameter, a value for a rate matching output sequence length for Uplink Control Information (UCI) on the PUSCH is determined, for determining the size of the transport block, by selecting between a first calculation and a second calculation, in a case that the first determination method is applied, the first calculation of the value uses a first scaling factor, and in a case that the second determination method is applied, the second calculation of the value uses a second scaling factor different from the first scaling factor, the NaRE is a value for determining the first NRE or the second NRE, and the nPRB is a number of resource blocks assigned for the PUSCH.

2. A base station apparatus comprising:

control circuitry configured to select between a first determination method and a second determination method for determining a size of a transport block in a Physical Uplink Shared Channel (PUSCH) based on a value of a time domain resource assignment field included in a Downlink Control Information (DCI) format for scheduling the PUSCH; and reception circuitry configured to receive the PUSCH, wherein:

in the first determination method, a number of resource elements (NRE) for determining the size of the transport block is calculated according to a first equation:

NRE=min(156, NaRE)·nPRB, in the second determination method, the NRE for determining the size of the transport block is calculated according to a second equation:

NRE=min(156, NaRE)·nPRB·y, wherein y is provided by a Radio Resource Control (RRC) parameter, a value for a rate matching output sequence length for Uplink Control Information (UCI) on the PUSCH is determined, for determining the size of the transport block, by selecting between a first calculation and a second calculation, in a case that the first determination method is applied, the first calculation of the value uses a first scaling factor, and in a case that the second determination method is applied, the second calculation of the value uses a second scaling factor different from the first scaling factor, the NaRE is a value for determining the first NRE or the second NRE, and the nPRB is a number of resource blocks assigned for the PUSCH.

3. A communication method performed by a terminal apparatus, the communication method comprising:

selecting between a first determination method and a second determination method for determining a size of a transport block in a Physical Uplink Shared Channel (PUSCH) based on a value of a time domain resource assignment field included in a Downlink Control Information (DCI) format for scheduling the PUSCH; and transmitting the PUSCH, wherein:

in the first determination method, a number of resource elements (NRE) for determining the size of the transport block is calculated according to a first equation:

NRE=min(156, NaRE)·nPRB, in the second determination method, the NRE for determining the size of the transport block is calculated according to a second equation:

NRE=min(156, NaRE)·nPRB·y, wherein y is provided by a Radio Resource Control (RRC) parameter, a value for a rate matching output sequence length for Uplink Control Information (UCI) on the PUSCH is determined, for determining the size of the transport block, by selecting between a first calculation and a second calculation, in a case that the first determination method is applied, the first calculation of the value uses a first scaling factor, and in a case that the second determination method is applied, the second calculation of the value uses a second scaling factor different from the first scaling factor, the NaRE is a value for determining the first NRE or the second NRE, and the nPRB is a number of resource blocks assigned for the PUSCH.

4. The terminal apparatus according to claim 1, wherein in the second calculation, at least a first parameter $\beta_{offset}$ used in the first calculation is replaced with a second parameter $\beta_{offset}$, different from the first parameter $\beta_{offset}$.

5. The terminal apparatus according to claim 1, wherein a parameter of a code block size used in the first calculation and a parameter of a code block size used in the second calculation are different.

6. The base station apparatus according to claim 2, wherein in the second calculation, at least a first parameter $\beta_{offset}$ used in the first calculation is replaced with a second parameter $\beta_{offset}$, different from the first parameter $\beta_{offset}$.

7. The base station apparatus according to claim 2, wherein a parameter of a code block size used in the first calculation and a parameter of a code block size used in the second calculation are different.

* * * * *